(12) United States Patent
Ray et al.

(10) Patent No.: US 8,702,480 B1
(45) Date of Patent: Apr. 22, 2014

(54) POULTRY WING SEGMENTING SHACKLE AND METHOD OF USE

(71) Applicant: WRH Holdings, LLC, Gainesville, GA (US)

(72) Inventors: David Bobby Ray, Gainesville, GA (US); Raymond Gene Duncan, Dawsonville, GA (US); Robert Lee Darby, Canton, GA (US); Anthony W. Rice, Clermont, GA (US); Dane T. Woods, Gainesville, GA (US)

(73) Assignee: WRH Holdings, LLC, Gainesville, GA (US)

( * ) Notice: Subject to any disclaimer, the term of this patent is extended or adjusted under 35 U.S.C. 154(b) by 0 days.

(21) Appl. No.: 13/906,912

(22) Filed: May 31, 2013

Related U.S. Application Data

(63) Continuation-in-part of application No. 13/900,988, filed on May 23, 2013, which is a continuation-in-part of application No. 13/711,963, filed on Dec. 12, 2012, now Pat. No. 8,517,805.

(51) Int. Cl.
  *A22C 21/00* (2006.01)
(52) U.S. Cl.
  USPC .......................................................... 452/169
(58) Field of Classification Search
  USPC ........................... 452/149, 166, 167, 169, 170
  See application file for complete search history.

(56) References Cited

U.S. PATENT DOCUMENTS

| | | | |
|---|---|---|---|
| 4,207,653 A | 6/1980 | Gasbarro | |
| 4,442,741 A | 4/1984 | Whittingham et al. | |
| 4,480,353 A | 11/1984 | Martin et al. | |
| 4,577,368 A * | 3/1986 | Hazenbroek | 452/165 |
| 4,769,872 A | 9/1988 | Hazenbroek | |
| 5,078,644 A | 1/1992 | DiGerlando | |
| 5,080,631 A | 1/1992 | Howard et al. | |
| 5,147,241 A * | 9/1992 | Rudin | 452/169 |
| 5,176,564 A | 1/1993 | Hazenbroek | |
| 5,188,559 A * | 2/1993 | Hazenbroek | 452/167 |
| 5,188,560 A | 2/1993 | Hazenbroek | |
| 5,312,291 A * | 5/1994 | van den Nieuwelaar et al. | 452/165 |
| 5,429,549 A | 7/1995 | Verrijp et al. | |
| 5,496,210 A * | 3/1996 | Davis | 452/169 |
| 5,613,431 A | 3/1997 | Tateno | |
| 6,036,596 A | 3/2000 | Lay | |
| 6,929,541 B2 | 8/2005 | Cervantes et al. | |
| 7,059,954 B2 * | 6/2006 | Annema et al. | 452/136 |
| 7,261,629 B2 | 8/2007 | Holleman | |
| 7,341,505 B1 * | 3/2008 | Gasbarro | 452/169 |
| 7,374,478 B2 | 5/2008 | Gasbarro | |
| 8,517,805 B1 | 8/2013 | Ray et al. | |
| 2002/0058470 A1 | 5/2002 | Schmidt et al. | |
| 2003/0084856 A1 | 5/2003 | Hazenbroek et al. | |
| 2010/0317272 A1 | 12/2010 | Hazenbroek et al. | |
| 2011/0237172 A1 | 9/2011 | McBrayer et al. | |

* cited by examiner

*Primary Examiner* — Richard Price, Jr.

(74) *Attorney, Agent, or Firm* — Mathew L. Grell; Balser & Grell IP Law

(57) ABSTRACT

A poultry wing segmenting shackle and method of use having bifurcated support device, preferably configured as guide fingers to form bifurcated opening having an open end gripper to support the poultry wing therein and wherein bifurcated support device includes leading prong and trailing prong whereby leading prong longer in length (or extends beyond) trailing prong, and, thus, functions to improve the release of poultry wing therefrom poultry wing shackle.

14 Claims, 17 Drawing Sheets

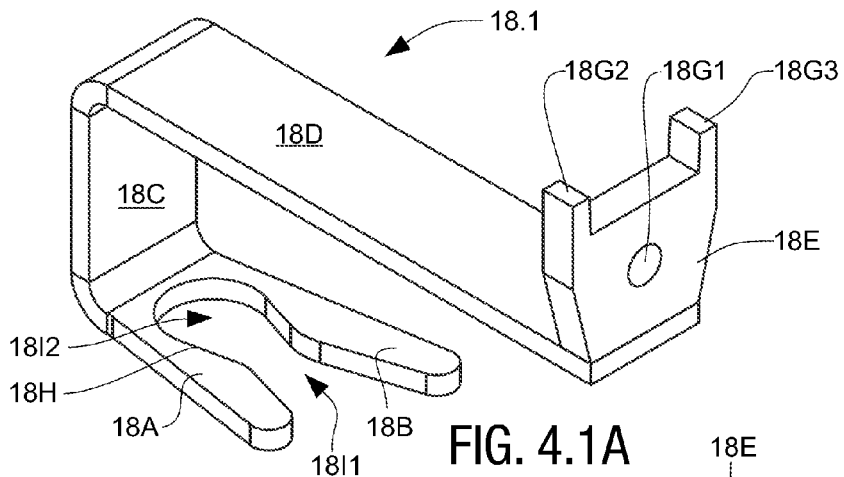
FIG. 4.1A
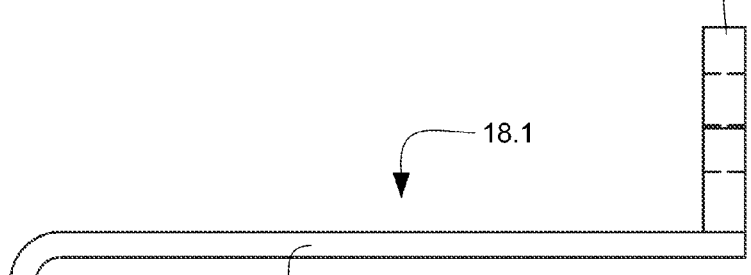
FIG. 4.1B
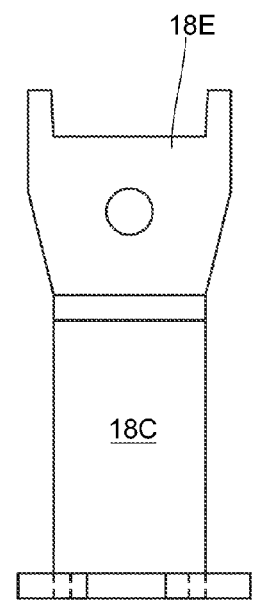
FIG. 4.1C
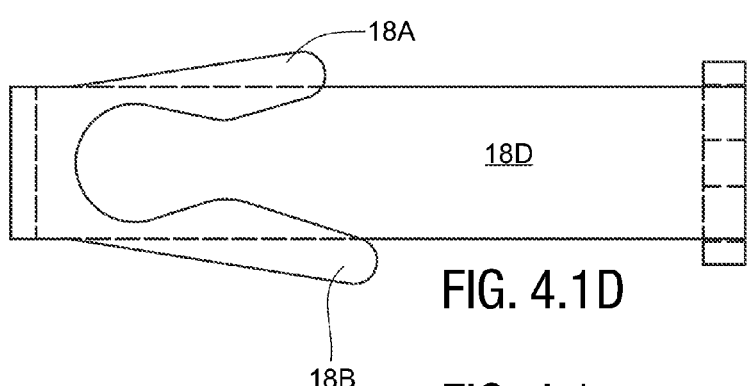
FIG. 4.1D
FIG. 4.1

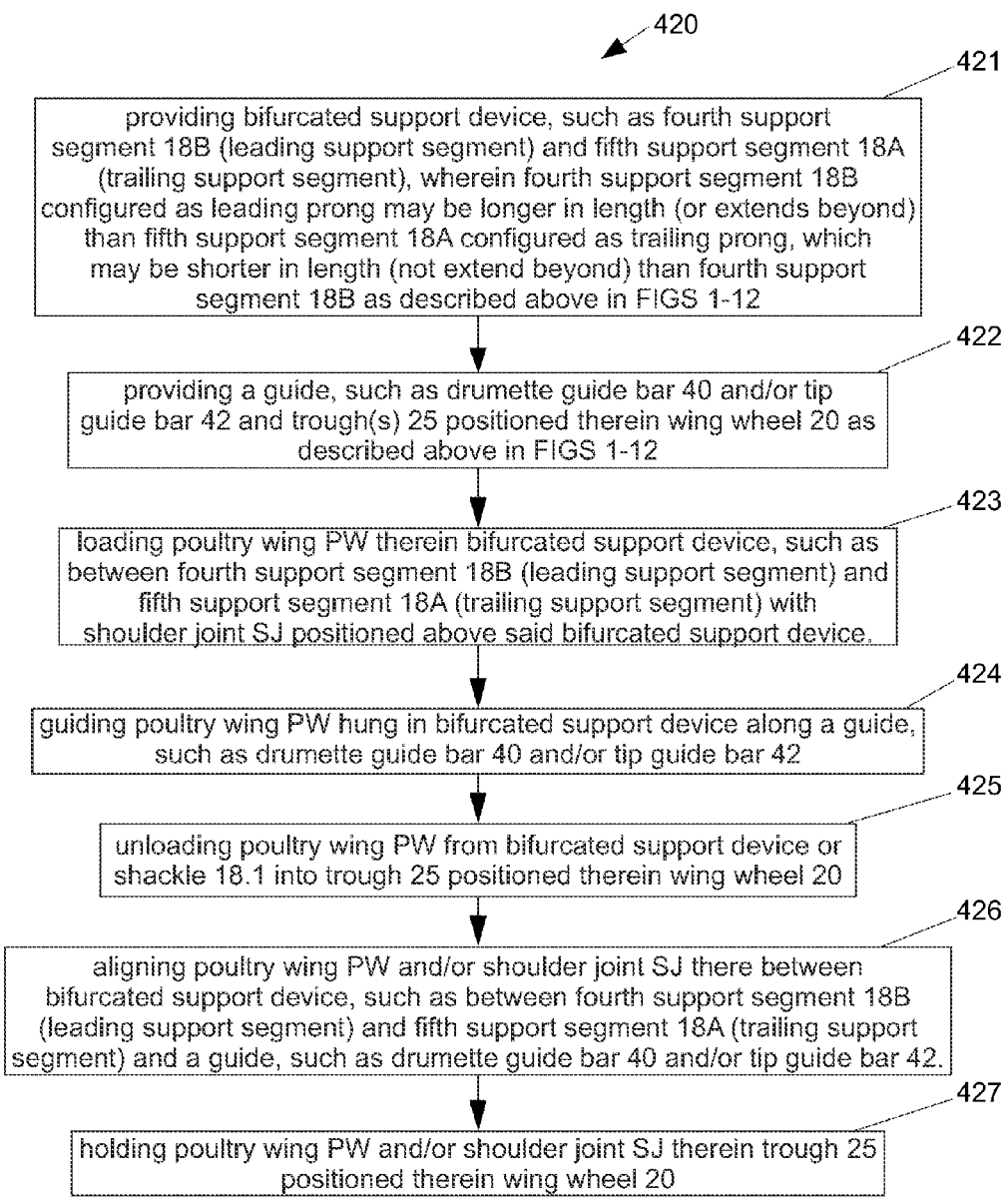
FIG. 4.2

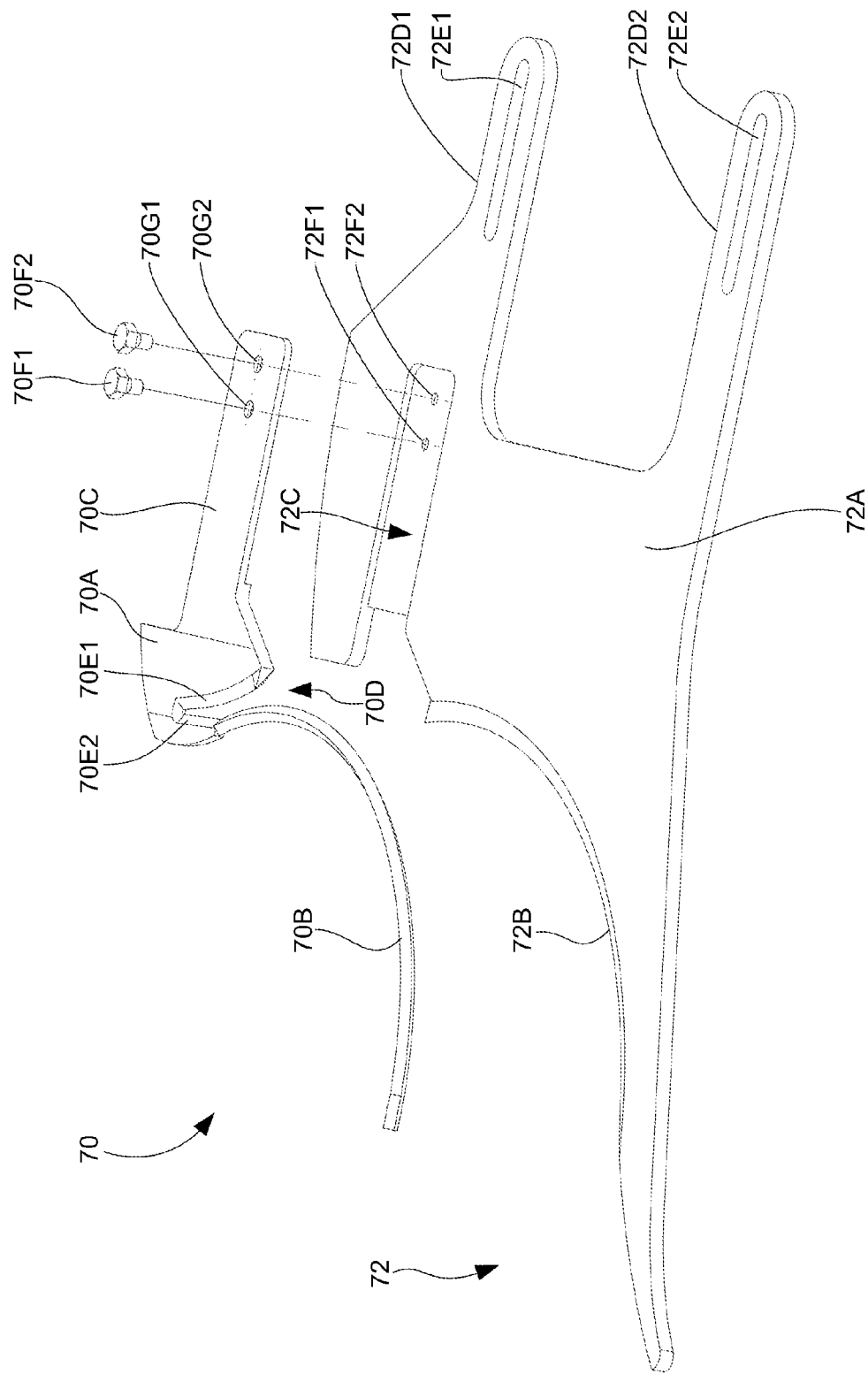
FIG. 8.1

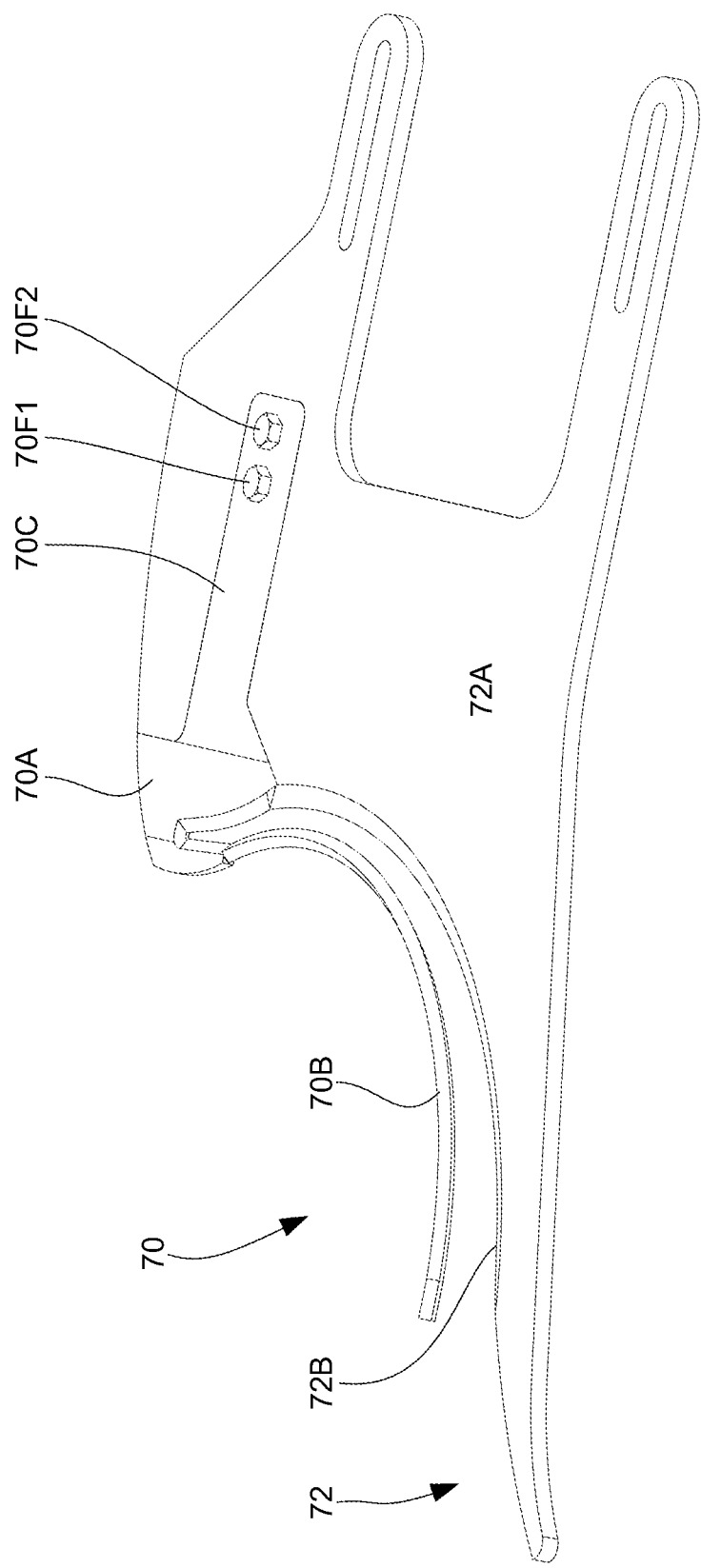
FIG. 8.2

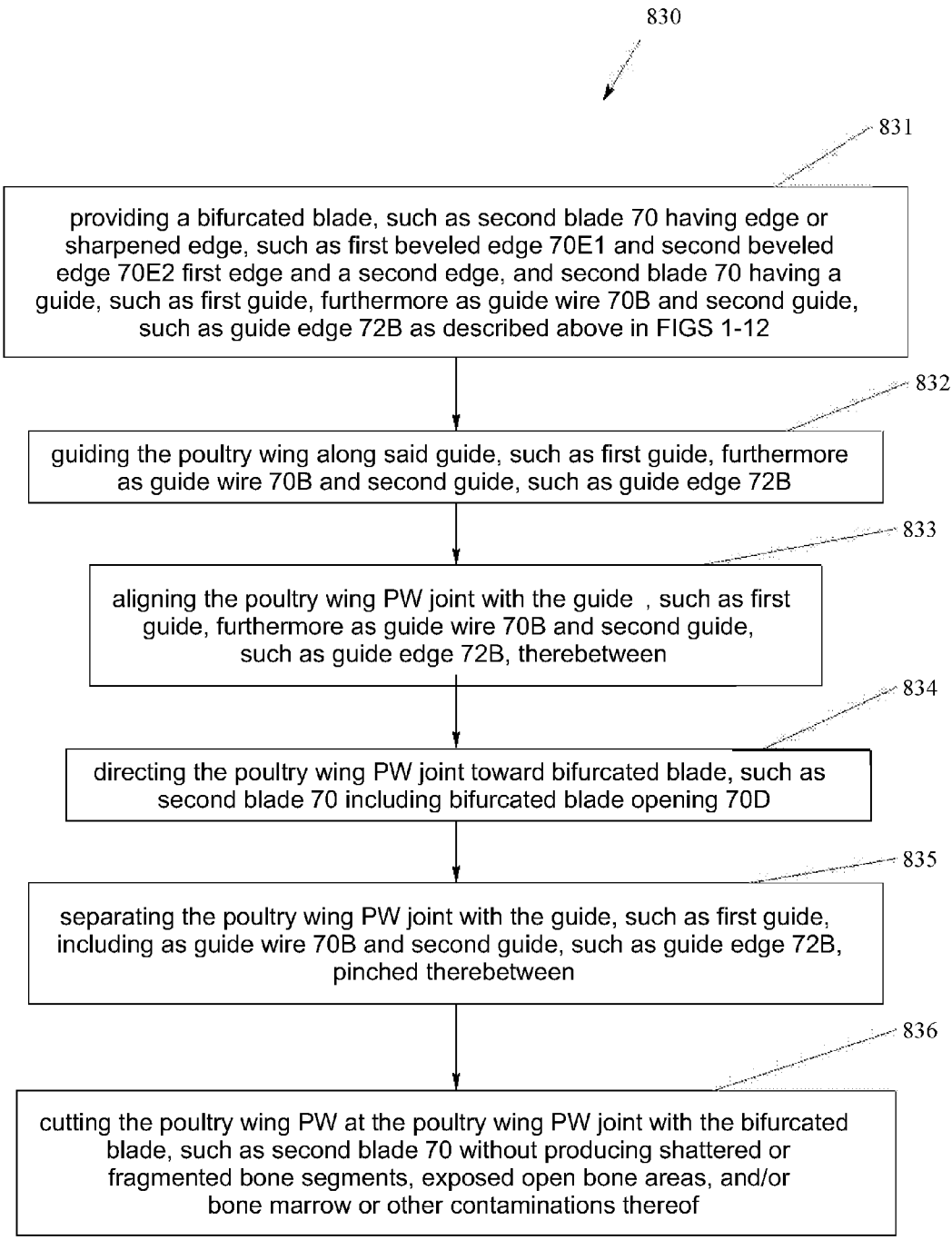
FIG. 8.3

POULTRY WING SEGMENTING SHACKLE AND METHOD OF USE

CROSS REFERENCE TO RELATED APPLICATIONS

To the full extent permitted by law, the present United States Non-provisional Patent Application, is a Continuation-in-Part of, and hereby claims priority to and the full benefit of U.S. Non-Provisional patent application entitled, "Poultry Wing Segmenting Blade and Method of Use," filed on May 23, 2013, having assigned Ser. No. 13/900,988 (a continuation-in-part of application Ser. No. 13/711,963, filed on Dec. 12, 2012), which claims priority to and the full benefit of United States Non-provisional Patent Application entitled "Poultry Wing Segmenting System and Method of Use," having assigned Ser. No. 13/711,963, filed on Dec. 12, 2012, incorporated herein by reference in its entirety.

TECHNICAL FIELD

The disclosure generally relates to butchering and more specifically, it is related to subdivision of a poultry wing into three segments.

BACKGROUND

The poultry wings, especially chicken wings, are typically presented as spiced buffalo wings in the form of flats and drums. Such poultry wings or wing segments are eaten by holding the cooked wings or wing segments in the hands and eating the meat away from the bones. In order to segment the poultry wings into flats and drumettes the poultry wing must be portioned into drumette, flat, and tip.

At first, the separation of the wing segments from one another was performed by hand. For example, the poultry wing is removed from the poultry carcass by cutting the poultry carcass at the carcass shoulder joints and then cutting the poultry wings at the elbow joint between the drumette and flat, and at the tip joint between the flat and wing tip sections to produce separate poultry wing segments. Such manual poultry wing processing was expensive and time consuming. However, with the growing consumer demand for segmented poultry wings, it became desirable to automate the processing of poultry wings.

One approach is a poultry wing portioner, which after the whole wing(s) are removed from the carcass they are manually placed in a vertically rotatable wheel which has a plurality of circumferentially spaced lateral troughs therearound, in which the poultry wings are horizontally positioned and presented for being cut into drumette, flats, and tip wing. Specifically, such vertically rotatable wheel has a pair of annular slots or grooves into which cutting blades whether stationary or rotating, are positioned. With the poultry wing received in one of the circumferentially spaced lateral troughs such that the elbow joint and tip joint of such poultry wing align respectively with the two annular slots of such wheel, the poultry wing portioner may be used to draw knife blades through such slots so as to cut apart the poultry wing at the respective joints.

Another approach is a poultry wing cutting apparatus or wing portioner characterized by a rotatably mounted drum-like wing retaining member provided with a plurality of spaced wing receiving grooves extending generally in an axial direction along the outer surface of the retaining member. A plurality of axially spaced slots is provided which intersect the grooves. Knife means are provided which extend into predetermined portions of said slots and cooperative with a plurality of wing engaging members which are disposed in other preselected slots to bias said wing downwardly against each of said knife means to selectively sever the wing at desired locations. Such wing portioner may operate efficiently at 50-60 wings per minute; however, this speed is dependent on the operator's ability to load wings into the portioner.

Another approach includes a loop conveyor of poultry wing shackles and a circular saw or a conveyor that holds the carcass in an inverted attitude suspended by their legs from shackles as their torsos move between a pair of guide rods and guide rails specifically for guiding the pair of elbow joints through the disc cutters. The portioner is configured to enable a user to place poultry wings in the shackles, which are conveyed past a circular saw. The circular saw cuts the poultry wings into drumette, flats, and tip wing.

Another approach includes poultry wings suspended by their tip segments and oriented so that their outside surfaces face one side of the processing path, with right wings oriented with their elbows leading, and left wings oriented with their elbows trailing. The elbow joints are bent by a bending guide, opening the elbow joints. The open joints are cut and separated into drumettes and flats.

The problems associated with such poultry wing apparatus include the requirement to load left wing and right wing differently, the accuracy of the joint cuts is dependent on the individual sizes of the drumette, flat, and tip and also dependent upon whether the poultry wing is a right hand wing or a left hand wing. If the poultry wing(s) are incorrectly cut such cuts will produce wing segments that contain shattered or fragmented bone segments, exposed open bone areas, and/or bone marrow contamination resulting in degraded and less valuable wing segments.

Therefore, it is readily apparent that there is a recognizable unmet need for a poultry wing segmenting shackle and method of use that is not dependent on left wing and right wing orientation, and which can produce consistent high speed joint cuts without producing shattered or fragmented bone segments, exposed open bone areas, and/or bone marrow contamination.

SUMMARY

Briefly described, in an example embodiment, the present apparatus and method overcomes the above-mentioned disadvantages and meets the recognized need for a poultry wing segmenting shackle and method of use having bifurcated support device, preferably configured as guide fingers to form bifurcated opening having an open end gripper to support the poultry wing therein and wherein bifurcated support device includes leading prong and trailing prong whereby leading prong longer in length (or extends beyond) trailing prong, and, thus, functions to improve the release of poultry wing therefrom poultry wing shackle.

According to its major aspects and broadly stated, the present apparatus meets the recognized need for a poultry wing segmenting blade to segment a poultry wing into segments at the poultry wing joint, the blade includes a bifurcated blade having a first edge and a second edge, and further comprises a guide, the guide configured to align the poultry wing joint with the bifurcated blade configured to separate the joint and cut the poultry wing and, thus, functions to produce consistent high speed joint cuts without producing shattered or fragmented bone segments, exposed open bone areas, and/ or bone marrow contamination.

According to its major aspects and broadly stated, the present apparatus meets the recognized need for a poultry wing segmenting system, in general, a drive mechanism, a conveyor having a plurality of spaced shackles which hold the poultry wing suspended by their shoulder joints vertically positioned and presented to a horizontally rotatable wheel which has a plurality of circumferentially spaced lateral notched slots therearound, to receive the vertical hung poultry wing, the rotatable wheel has a pair of annular slots or grooves into which cutting blades are positioned, a plurality of wing engaging members and guide members which are disposed in other preselected positions to bias and open the wing joints against cutting blades drawn through the annular slots to selectively sever the wing at the elbow joint between the drumette and flat, and at the tip joint between the flat and wing tip to produce separate poultry wing segments of drumette, flat, and tip and discharge them into individual receptacles and, thus, functions to produce consistent high speed joint cuts without producing shattered or fragmented bone segments, exposed open bone areas, and/or bone marrow contamination.

According to its major aspects and broadly stated, the present apparatus meets the recognized need for a poultry wing segmenting system to segment the poultry wing into segments, a drumette having a shoulder joint, a flat having an elbow joint and a tip joint, and a tip, said system includes a drive mechanism, a conveyor having a plurality of spaced shackles configured to vertically hold the poultry wing suspended by its shoulder joint, a segmented wheel configured with a plurality of contoured troughs circumferentially disposed laterally therearound said segmented wheel, said wheel configured to receive the vertical hung poultry wing from said shackles, and wherein said segmented wheel is configured with one or more annular slots wherein at least one cutting blade is positioned, and wherein said segmented wheel is further configured with a pivotable wing tip cup, at least one guide bar disposed adjacent said segmented wheel to bias the at least one segment of the poultry wing against said contoured trough of said segmented wheel and to draw said cutting blade through said annular slots to sever the poultry wing into one or more segments.

In a preferred embodiment a poultry wing segmenting shackle for a drumette shoulder portion of a poultry wing, said shackle includes a bifurcated support device having a first leading support segment and a second trailing support segment, wherein the first leading support segment extends beyond the second trailing support segment In a preferred embodiment of the poultry wing segmenting blade to segment a poultry wing into segments at the poultry wing joint, the blade comprising a bifurcated blade having a first edge and a second edge configured to separate the joint and cut the poultry wing.

In still a further exemplary embodiment a method of controlling a poultry wing having a poultry wing shoulder joint, the method includes the steps of providing a bifurcated support device having a first leading support segment and a second trailing support segment, wherein the first leading support segment extends beyond the second trailing support segment, a guide, and a trough therein a wing wheel, loading the poultry wing into the bifurcated support device with the poultry wing shoulder joint positioned above the bifurcated support device, guiding the poultry wing hung in the bifurcated support device along the guide, and unloading the poultry wing into the trough therein the wing wheel.

In still a further exemplary embodiment a method of segmenting a poultry wing having a poultry wing joint, said method having the steps of providing a bifurcated blade having a first edge and a second edge, and the bifurcated blade having a guide for guiding the poultry wing along the guide, aligning the poultry wing joint with the guide, directing the poultry wing joint toward the bifurcated blade, separating the poultry wing joint with the guide, and cutting the poultry wing at the poultry wing joint with the bifurcated blade.

Accordingly, a feature of the poultry wing segmenting system and method of use is its ability to reduce the bottle neck of having a single operator feed individual poultry wings into a vertical wing wheel of a wing portioner, and thus, expand to multiple operators feeding individual poultry wings into shackles along a shackle line.

Another feature of the poultry wing segmenting system and method of use is its ability to reduce the number of motors required to operate a poultry wing portioner. Yet another feature of the poultry wing segmenting system and method of use is its ability to reduce energy consumption of the wing portioner station and reduce the overall energy demand of the poultry processing line.

Yet another feature of the poultry wing segmenting system and method of use is its ability to improve the overall efficiency of a poultry processing line and the efficient operation of the wing portioner station or processing phase.

Yet another feature of the poultry wing segmenting system and method of use is its ability to efficiently and consistently provide Grade A high speed joint cuts without producing shattered or fragmented bone segments, exposed open bone areas, and/or bone marrow contamination.

Yet another feature of the poultry wing segmenting system and method of use is its ability to provide a more safe work environment for machine operators by eliminating rotating blades as a cutting means.

Yet another feature of the poultry wing segmenting system and method of use is its ability to hang the poultry wing in the shackle by gripping the shoulder joint or drumette rather than hanging the poultry wing by the wing tip, which can slip from the shackle.

Yet another feature of the poultry wing segmenting system and method of use is its ability to remove or transfer the poultry wing from its shackle to a wheel or rotary drum prior to cutting the poultry wing into its segments.

Yet another feature of the poultry wing segmenting system and method of use is its ability to provide a wheel or rotary drum having cutouts with adjacent pivoting cams to facilitate transfer of the poultry wing from its shackle to a wheel or rotary drum prior to cutting the poultry wing into its segments.

Yet another feature of the poultry wing segmenting system and method of use is its ability to provide a pivotable cam for each rotary drum cutout to drop or unload the poultry wing tip into its receptacle rather than prior arts use of gravity.

Yet another feature of the poultry wing segmenting system and method of use is its ability to provide guide bars which hold the poultry wing segments until dropped into their respective receptacles rather than holding the poultry wing only while it's being cut.

Yet another feature of the poultry wing segmenting system and method of use is its ability to provide guide bars which guide and hold the poultry wing segments (tip, mid, and drum sections) until dropped into their respective receptacles.

Yet another feature of the poultry wing segmenting system and method of use is its ability to provide a spring loaded finger to unload the tip into its receptacle.

Yet another feature of the poultry wing segmenting system and method of use is its ability to provide slide plates which hold the poultry wing flat segment until slid and dropped into its receptacle.

Yet another feature of the poultry wing segmenting system and method of use is its ability to provide a separation arc, which holds the poultry wing drumette segment until dropped into its receptacle.

Yet another feature of the poultry wing segmenting system and method of use is its ability to provide a separation arc, which holds the poultry wing drumette segment until dropped into its receptacle.

Yet another feature of the poultry wing segmenting system and method of use is its ability to hold the drumette using a drumette guide rod on the outside of the drumette and a drumette guide plate on the inside of the drumette.

Yet another feature of the poultry wing segmenting system and method of use is its ability to drop segmented poultry wing segments in sequence of tip, flat, and drumette into individual receptacle.

Yet another feature of the poultry wing segmenting system and method of use is its ability to provide a pivotable blade to enable easy cleaning and maintenance and repair or replacement.

Yet another feature of the poultry wing segmenting system and method of use is its ability to provide a poultry wing shackle system rather than a single operator feed wheel enabling faster processing times and multiple workers may load poultry wings along a moving shackle system.

Yet another feature of the poultry wing segmenting system and method of use is its ability to provide a new stationary blade design and configuration.

Yet another feature of the poultry wing segmenting blade and method of use is its ability to provide a bifurcated blade having a two sided curved wing joint positioner and interchangeable v-shaped blade, the joint positioner having dull and sharp sections wherein the two sided curved wing joint positioner or guide is configured to align, separate, and cut the poultry wing along its joints into poultry segments.

Yet another feature of the poultry wing segmenting blade and method of use is its ability to provide a bifurcated blade that functions to center the blade in the poultry wing joint to help perfect the cut without producing shattered or fragmented bone segments, exposed open bone areas, and/or bone marrow or other contaminations thereof.

Yet another feature of the poultry wing segmenting shackle and method of use is its ability to provide a leading prong that is longer in length (or extends beyond) a trailing prong, and such configuration enables improved and/or efficient release or unloading of poultry wing therefrom poultry wing shackle.

Yet another feature of the poultry wing segmenting shackle and method of use is its ability to provide a trailing prong that is shorter in length than a leading prong, and such configuration enables improved and/or efficient release or unloading of poultry wing therefrom poultry wing shackle.

Yet another feature of the poultry wing segmenting shackle and method of use is its ability to provide a leading prong that is longer in length for additional support of the poultry wing as it traverses drumette guide bar, tip guide bar, and/or trough of wing wheel.

Yet another feature of the poultry wing segmenting shackle and method of use is its ability to provide a leading prong and a trailing prong that form a variable v-shaped gap, and such configuration enables improved and/or efficient securing, hanging, or holding of a variety of sized poultry wings whether (larger, medium, or small poultry wings).

Yet another feature of the poultry wing segmenting shackle and method of use is its ability to be frictionally engaged by drumette guide bar, tip guide bar, and/or trough of wing wheel as poultry wings traverses in an arcuate path about wing wheel.

These and other features of the poultry wing segmenting shackle and method of use will become more apparent to one skilled in the art from the following Brief Description of the Drawings, Detailed Drawings, Detailed Description and Claims when read in light of the accompanying drawings.

BRIEF DESCRIPTION OF THE DRAWINGS

The present retractable display system and method of use or the like will be better understood by reading the Detailed Description of the embodiments with reference to the accompanying drawings, in which like reference to numerals denote similar structures and refer to like elements throughout, and in which:

FIG. 4.1A,B,C,D is a perspective, side, front, and bottom view of the poultry wing shackle, shown disassembled;

FIG. 4.2 is a flow diagram of a method of hanging and releasing a poultry wing therefrom poultry wing shackle;

FIG. 8.1 is a perspective top view of second blade and releasable holder, shown disassembled;

FIG. 8.2 is a perspective top view of second blade and releasable holder, shown assembled;

FIG. 8.3 is a flow diagram of a method of segmenting a poultry wing utilizing a bifurcated blade;

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-12 specific terminology is employed for the sake of clarity. The present disclosure; however, is not intended to be limited to the specific terminology so selected, and it is to be understood that each specific element includes all technical equivalents that operate in a similar manner to accomplish similar functions. Embodiments of the claims may; however, be embodied in many different forms and should not be construed to be limited to the embodiments set forth herein. The examples set forth herein are non-limiting examples, and are merely examples among other possible examples.

Figure 1:
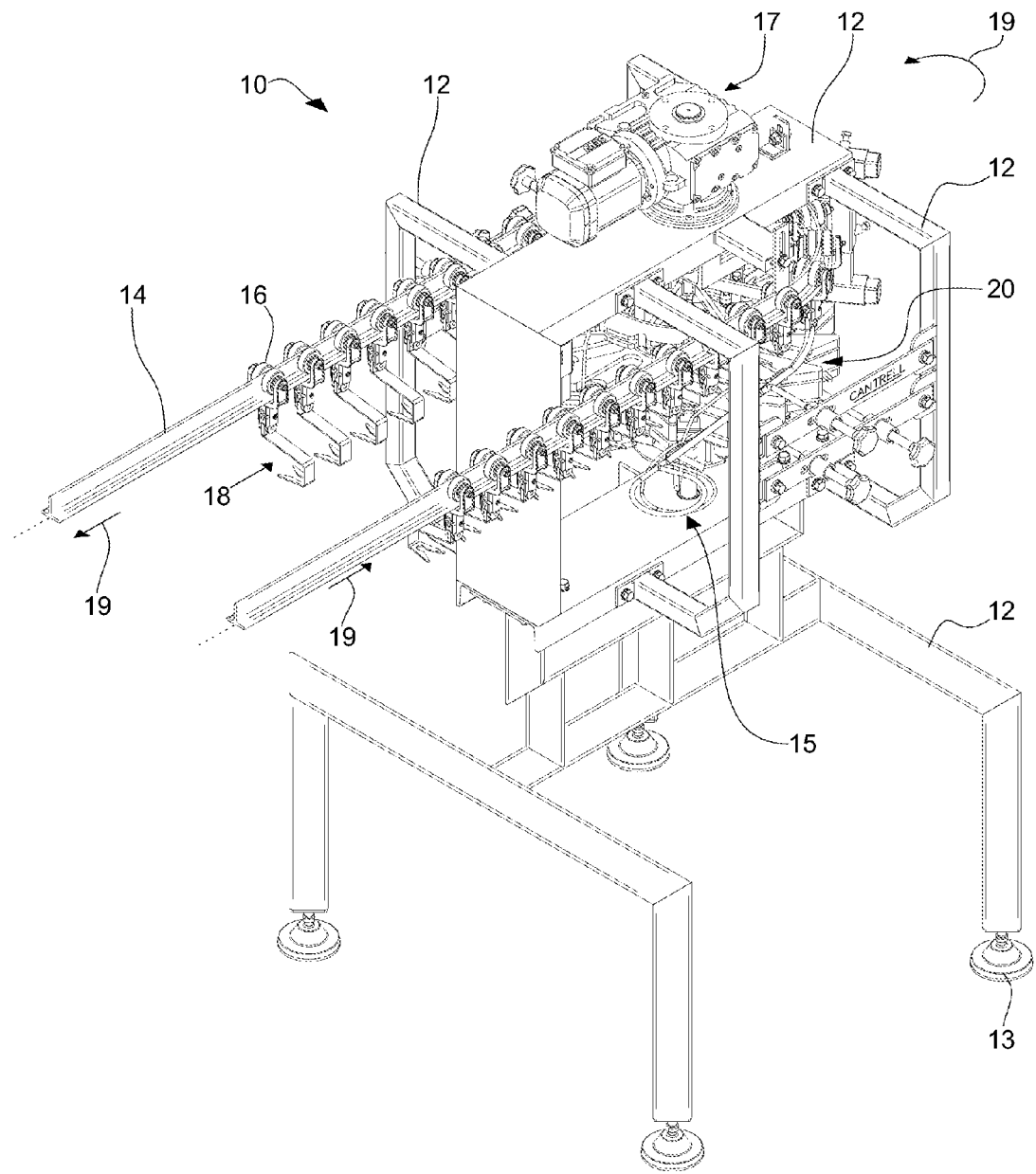
FIG. 1 is a perspective view of an exemplary poultry wing segmenter.

Referring now to FIG. 1 by way of example, and not limitation, there is illustrated an example embodiment exemplary poultry wing portioner or poultry wing segmenting system 10. Preferably, poultry wing segmenter 10 includes support structure, such as frame 12 configured to form the framework or support for poultry wing segmenter 10. Preferably, adjustable or leveling casters or foot pads 13 are preferably removeably affixed to frame 12 (likely on its underside) and provide contact support to a surface area, such as the plant floor and enable adjustment to level poultry wing segmenter 10. Frame 12 may be configured as solid or hollow member(s) having tubular, angled, sheet, or rectangular beam cross-section or the like to permit frame 12 to support poultry wing segmenter 10. Furthermore, poultry wing segmenter 10 preferably includes rotary guide or track, such as shackle rail 14, and a plurality of shackle assemblies 18 having wheels, such as rollers 16 to enable rotational travel and connection of shackle assembly 18 along and to shackle rail 14, spaced at intervals and travel as indicated by direction arrows 19. Preferably, shackle assemblies 18 are oriented to hold the poultry wing shoulder joint SJ and hold the poultry wing PW in a vertical orientation adjacent shackle rail 14. Still further, poultry wing segmenter 10 preferably includes rotational power source 17 which may further include motor, shaft, gear box or differential gear or drive gear, or toothed sprocket or belt or chain (not shown) to impart rotary movement of shackle assembly 18 about shackle rail 14 as indicated by direction arrows 19. Still yet further, poultry wing segmenter 10 preferably includes wing wheel 20 rotationally driven by power source 17 as indicated by arc direction arrows 19 and guide rods or guide bars 15 disposed along the perimeter of wing wheel 20, which guide poultry wing PW thereabout wing wheel 20.

It is recognized that poultry wing segmenter 10 may be configured with a single power source 17, thus reducing the number of motors required to operate poultry wing segmenter 10.

It is further recognized that poultry wing segmenter 10 configured with a single power source 17 preferably reduces energy consumption of the wing portioner station and reduces the overall energy consumption of the poultry processing line as a whole.

Frame 12, shackle assembly 18, shackle rail 14, and foot pads 13 are preferably formed, molded or configured from a suitable material, such as stainless steel, aluminum, sheet metal, plastic, or alternative resin, fiber, reinforced fiber, or other suitable rigid support material or the like and any manufacturing method, capable of providing structure to frame 12, shackle assembly 18, shackle rail 14, and foot pads 13. Preferably, the material includes other suitable characteristics, such as strength, rigidity, durability, water-resistance, light weight, smooth surface, impact resistant surface, cleanability, sterilization, chemical inertness, oxidation resistance, safety, longevity, or other beneficial characteristic understood by one skilled in the art.

Figure 2:
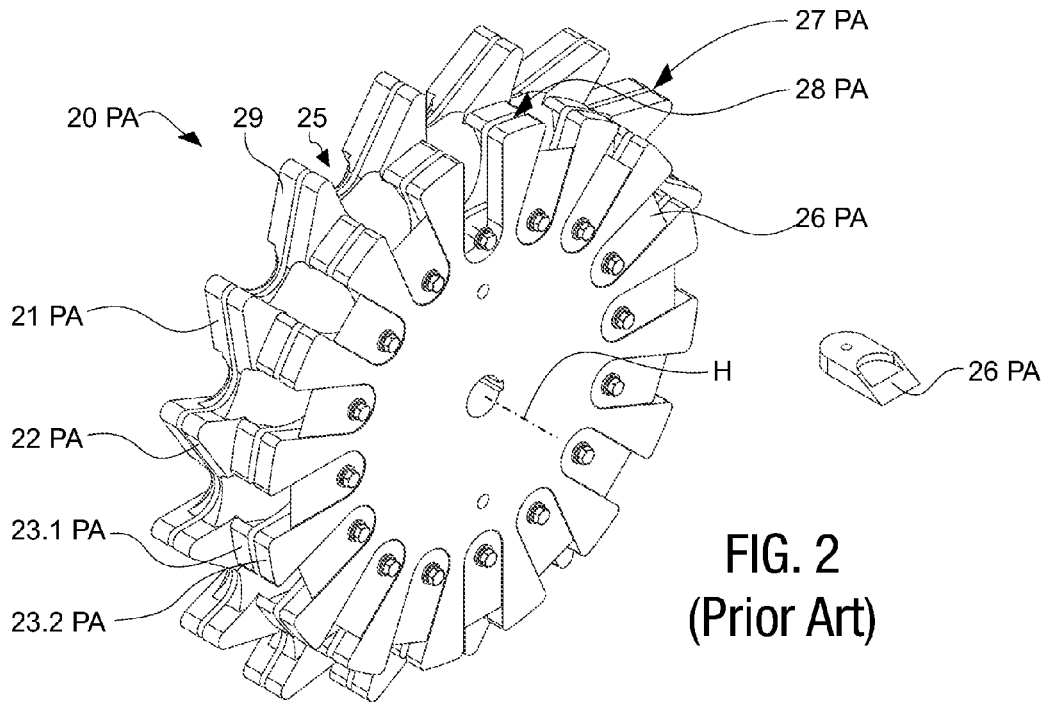
FIG. 2 is a perspective side view of a prior art wing wheel.

Referring now to FIG. 2 by way of example, and not limitation, there is illustrated a prior art wing wheel 20PA. Wing wheel 20PA includes a multi-piece wing wheel assembly formed of wheel segments, such as first wheel segment 21PA where the poultry wing drumette is positioned (not shown), second wheel segment 22PA where the poultry wing flat is positioned (not shown), third wheel segment 23.1PA where the poultry wing tip is positioned (not shown), and fourth wheel segment 23.2PA assembled about a common horizontal drive axis H. Positioned between multi-piece wing wheel segments are one or more knife blades (not shown), such as between first wheel segment 21PA and second wheel segment 22PA is first annular slot 27PA for receipt of an annular cutting blade (not shown) and between third wheel segment 23.1PA and fourth wheel segment 23.2PA is second annular slot 28PA for receipt of an annular cutting blade (not shown). Additionally, a plurality of teeth elements 29PA of predetermined shape are formed about the periphery of each of the respective wheel segments. Such wheel segments are collectively rotated about a common horizontal drive axis H in fixed relative alignment such that the teeth elements 29PA form a plurality of circumferentially spaced lateral troughs 25PA for receiving poultry wings therein to be cut apart by annular cutting blade (not shown) disposed in first annular slot 27PA and second annular slot 28PA. Moreover, wing wheel 20PA includes cup 26PA to hold the poultry wing tip in place to prevent it from dislodging horizontally from wing wheel 20PA.

Figure 3:
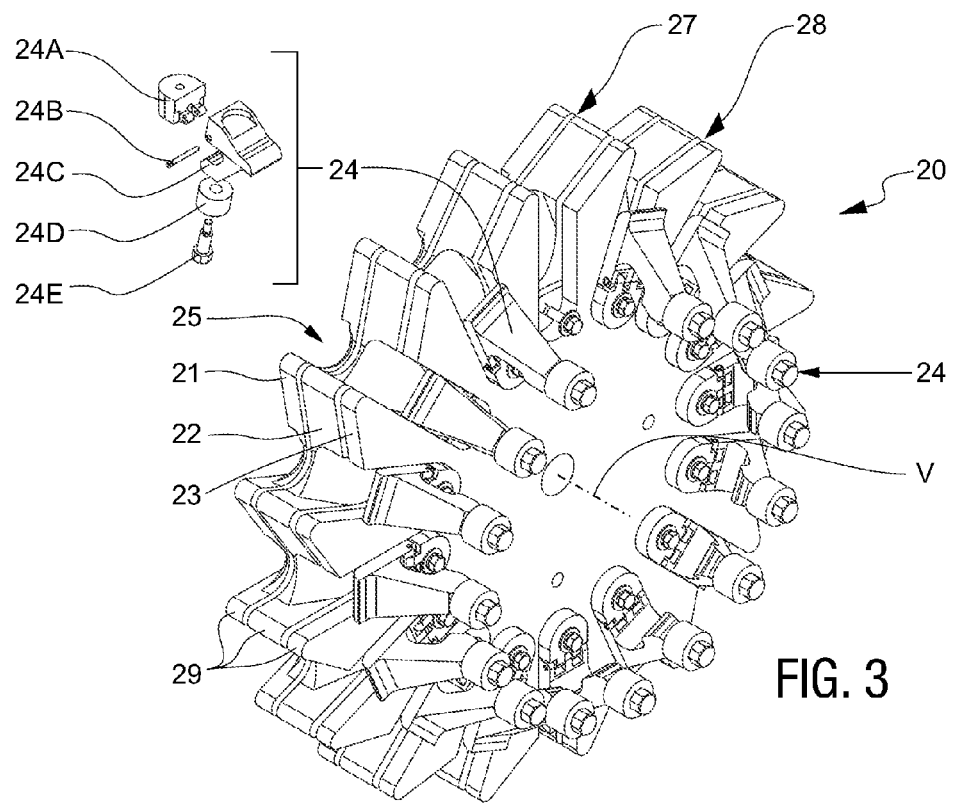
FIG. 3 is a perspective bottom view of an exemplary wing wheel of FIG. 1.

Referring now to FIG. 3 by way of example, and not limitation, there is illustrated an example embodiment exemplary wing wheel 20. Preferably, wing wheel 20 includes a multi-piece wing wheel assembly formed of wheel segments, such as first wheel segment 21 configured and positioned to receive and/or support the poultry wing drumette (not shown), second wheel segment 22 configured and positioned to receive and/or support the poultry wing flat (not shown), and third wheel segment 23 configured and positioned to receive and/or support the poultry wing tip (not shown), and such wheel segments are assembled about common vertical drive axis V. Positioned between multi-piece wing wheel segments preferably are one or more knife blades (not shown) and one or more annular slots, such as between first wheel segment 21 and second wheel segment 22 therein is preferably first annular slot 27 for receipt of first annular cutting blade (not shown) and between second wheel segment 22 and third wheel segment 23 is preferably second annular slot 28 for receipt of second annular cutting blade (not shown). Additionally, a plurality of teeth elements 29 of predetermined shape are formed about the periphery of each of respective wheel segments, first wheel segment 21, second wheel segment 22, and third wheel segment 23. Such wheel segments are collectively rotated about a common vertical drive axis V in fixed relative alignment such that teeth elements 29 form a plurality of circumferentially spaced lateral troughs 25 for receiving poultry wings therein to be cut into poultry wing segments of drumette, flat, and tip by first and second annular cutting blades (not shown) disposed in first annular slot 27 and second annular slot 28. It is contemplated herein that troughs 25 may be configured as contoured, concave, convex, combinations and the like. Moreover, wing wheel 20 preferably includes wing tip cup module 24, which is preferably pivotable by contacting and following a cam (not shown) to enable proper loading and positioning of poultry wing tip (not shown) within troughs 25 of wing wheel 20 and to prevent poultry wing tip (not shown) from an untimely dislodging horizontally from troughs 25 of wing wheel 20. Furthermore, wing tip cup module 24 includes mounting base 24A, pivot member 24C, pin 24B to removably affix mounting base 24A thereto pivot member 24C and to preferably enable hinged or pivot movement therebetween, wheel or roller 24D is preferably releasably affixed to the underside of pivot member 24C by attachment device 24E where roller 24D preferably rides cam 41 (shown in FIG. 4) to an open position to timely unload or discharge poultry wing tip (shown in FIG. 4).

Figure 4:
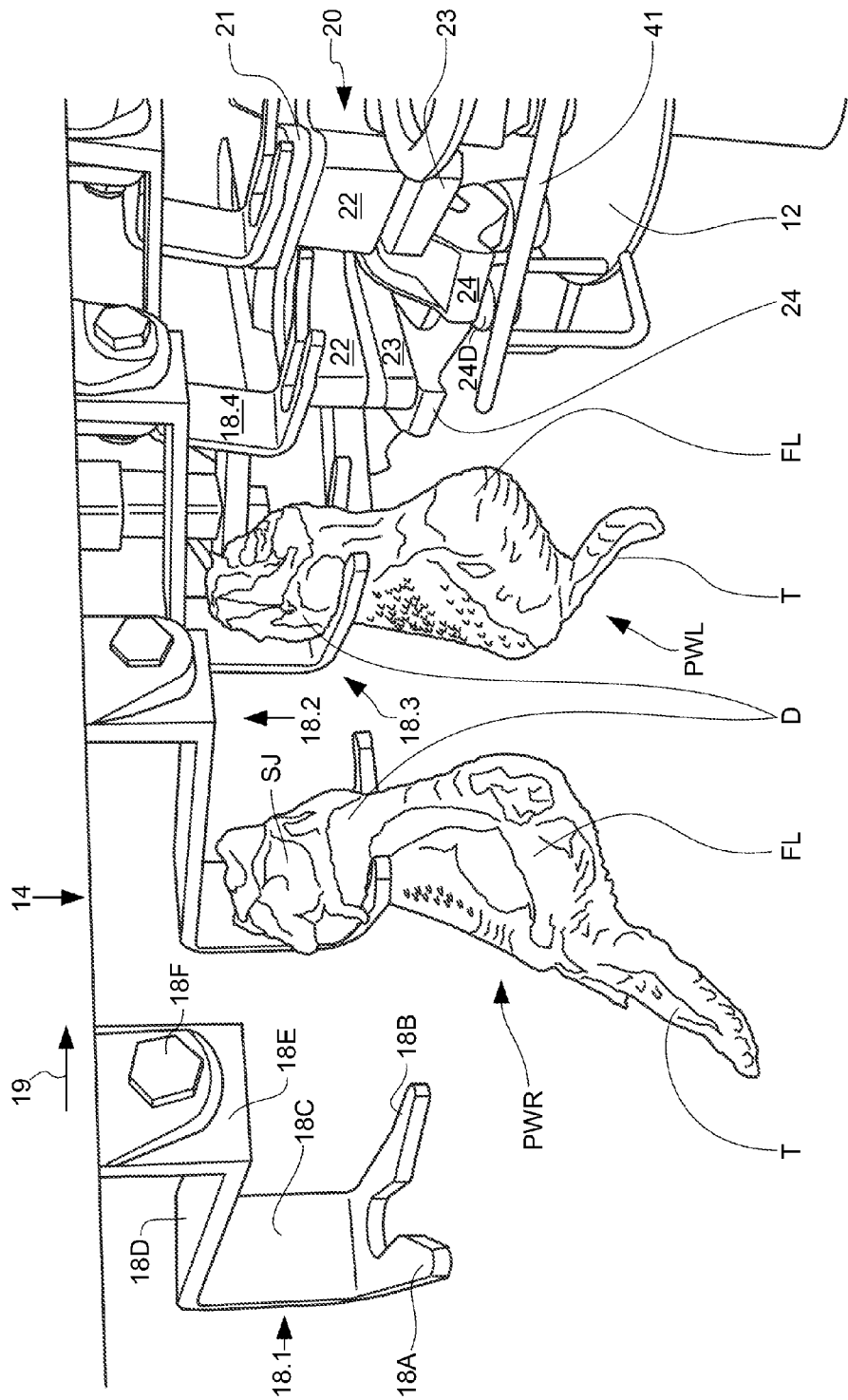
FIG. 4 is a partial perspective side view of the exemplary poultry wing segmenter of FIG. 1, showing one or more exemplary shackle assemblies traversing an exemplary shackle rail for loading poultry wings therein wing wheel.

Referring now to FIG. 4 by way of example, and not limitation, there is illustrated a partial perspective side view of poultry wing segmenter 10 showing one or more exemplary shackle assemblies 18 traversing an exemplary shackle rail 14 for loading left or right poultry wings therein to wing wheel 20. Preferably, poultry wing segmenter 10 includes one or more shackle assemblies 18 moving in series along shackle rail 14 via a trolley chain (not shown), as indicated by direction arrows 19. Each shackle assembly 18, such as shackle assembly 18.1, preferably includes one or more support segments and one or more transition points, such as first support segment 18E oriented in an upright attitude and releasably connected on its upper end to roller 16 (shown in FIG. 1) via attachment device 18F. Furthermore, first support segment 18E is preferably connected and/or transitioned to second support segment 18D oriented in a horizontal attitude and further connected or transitioned to third support segment 18C oriented in an upright attitude, which is preferably connected or transitioned to lower end of shackle 18, such as fourth support segment 18B and fifth support segment 18A, which form a bifurcated, u-shaped, and/or v-shaped poultry wing shoulder carrier.

It is recognized herein that poultry wing segmenter 10 may accommodate left poultry wings PWL and/or right poultry wings PWR, as shown in FIG. 4.

It is further recognized herein that poultry wing segmenter 10 reduces the bottle neck of having a single operator feed individual poultry wings into a vertical wing wheel of a wing portioner, and thus, expands operation to multiple operators feeding individual poultry wings PW into shackles 18 along a shackle line or shackle rail 14.

It is further recognized herein that shackles 18 of poultry wing segmenter 10 are preferably configured to hang poultry wing PW in shackle 18 by bifurcated fourth support segment 18B and fifth support segment 18A gripping shoulder joint SJ or drumette D rather than hanging the poultry wing PW upside down by hanging from wing tip T, which can slip from the shackle 18.

Referring now to FIG. 4.1A, 4.1B, 4.1C, 4.1D by way of example, and not limitation, there is illustrated a perspective, side, front, and bottom view of exemplary poultry wing shackle 18.1. Preferably poultry wing shackle 18.1 includes first support segment 18E, an attachment device, such as aperture 18G1 and alignment device, such as first alignment peg 18G2 and second alignment peg 18G3 to align and attach poultry wing shackle 18.1 thereto shackle assemblies 18. Poultry wing shackle 18.1 preferably includes one or more support or positioning segments therebetween first support segment 18E and bifurcated prongs, such as fourth support segment 18B and fifth support segment 18A, such support or positioning segments may include a second support segment 18D (such as lateral section) and third support segment 18C (such as vertical or riser section). It is contemplated herein that first support segment 18E may be attached or transition thereto second support segment 18D. It is further contemplated herein that second support segment 18D may be attached or transition thereto third support segment 18C. It is still further contemplated herein that third support segment 18C may be attached or transition thereto bifurcated attachment device or prongs, such as fourth support segment 18B (leading support segment) and fifth support segment 18A (trailing support segment). Moreover, bifurcated support device, including fourth support segment 18B and fifth support segment 18A are preferably configured as guide fingers to form bifurcated opening 18I1, configured preferably as u-shaped, or v-shaped to receive and release a variety of sized poultry wing PW. Furthermore, bifurcated fourth support segment 18B and fifth support segment 18A are preferably configured with open end gripper 18I2, configured preferably as an open curve, such as open circle 18H or otherwise curved to support poultry wing PW by inserting drumette D therein bifurcated opening 18I1 (open end opening) and seating drumette D thereon open ended gripper 18I2, which prevent shoulder joint SJ from sliding therethrough open ended gripper 18I2 since open ended gripper 18I2 has a smaller opening, bifurcated opening 18I1, than shoulder joint SJ of poultry wing PW, thus to support poultry wing PW therein poultry wing shackle 18.1 while traversing through of poultry wing segmenter 10.

It is recognized herein that bifurcated fourth support segment 18B may be configured as leading prong and fifth support segment 18A may be configured as trailing prong. Moreover, fourth support segment 18B configured as leading prong may be longer in length (or extends beyond) than fifth support segment 18A configured as trailing prong, which may be shorter in length (not extend beyond) than fourth support segment 18B and such configuration enables improved and/or efficient release of poultry wing PW therefrom poultry wing shackle 18.1 as poultry wing PW is preferably being frictionally engaged by drumette guide bar 40B, tip guide bar 42B, and/or troughs 25 of wing wheel 20 as poultry wings PW traverses in an arcuate path about wing wheel 20, shown by direction arrows 19, shown in FIG. 5A. Moreover, fourth support segment 18B configured as leading prong may be longer in length (or extends beyond) than fifth support segment 18A configured as trailing prong, which may be shorter in length (not extend beyond) than fourth support segment 18B and such configuration enables efficient unloading of poultry wings PW therein troughs 25 of wing wheel 20.

It is contemplated herein that fifth support segment 18A configured as trailing prong is shorter in length than fourth support segment 18B configured as leading prong of poultry wing shackle 18.1, and such configuration enables improved and/or efficient release or unloading of poultry wing therefrom poultry wing shackle 18.1.

It is contemplated herein that fourth support segment 18B configured as leading prong may be longer in length (or extends beyond) than fifth support segment 18A configured as trailing prong of poultry wing shackle 18.1, and such configuration enables additional support of poultry wing PW as it traverses drumette guide bar 40B, tip guide bar 42B, and/or troughs 25 of wing wheel 20.

It is contemplated herein that bifurcated support device, including fourth support segment 18B and fifth support segment 18A are preferably configured as guide fingers to form bifurcated opening 18I1, configured preferably as u-shaped, or v-shaped to receive and release a variety of sized poultry wing PW, and such configuration enables efficient securing, hanging, or holding of a variety of sized poultry wings whether (larger, medium, or small poultry wings).

It is further recognized herein that shackles 18.1 enables drumette guide bar 40B, tip guide bar 42B, and/or troughs 25 of wing wheel 20 to be frictionally engaged by wing PW while shackles 18.1 secures, hangs, or holds poultry wing PW and while poultry wing PW traverses in an arcuate path about wing wheel 20.

It is further recognized herein that shackles 18.1 may be configured in a variety of shapes and transitions or contours between fourth support segment 18B and fifth support segment 18A, and first support segment 18E to properly receive, support, position, and/or release poultry wing PW relative to poultry wing segmenter 10.

Referring now to FIG. 4.2 by way of example, and not limitation, there is illustrated a flow diagram 420 of a method of controlling, loading, guiding, and releasing a poultry wing PW having a shoulder joint SJ. In block or step 421, providing bifurcated support device, such as fourth support segment 18B (leading support segment) and fifth support segment 18A (trailing support segment), wherein fourth support segment 18B configured as leading prong may be longer in length (or extends beyond) than fifth support segment 18A configured as trailing prong, which may be shorter in length (not extend beyond) than fourth support segment 18B (bifurcated support device). In block or step 422, providing a guide, such as drumette guide bar 40 and/or tip guide bar 42 and trough(s) 25 positioned therein wing wheel 20. In block or step 423, loading poultry wing PW therein bifurcated support device, such as between fourth support segment 18B (leading support segment) and fifth support segment 18A (trailing support segment) with shoulder joint SJ positioned above bifurcated support device. In block or step 424, guiding poultry wing PW hung in bifurcated support device along a guide, such as drumette guide bar 40 and/or tip guide bar 42. In block or step 425, unloading or releasing poultry wing PW from bifurcated support device or shackle 18.1 into trough 25 positioned therein wing wheel 20. In block or step 426, aligning poultry wing PW and/or shoulder joint SJ therebetween bifurcated support device, such as between fourth support segment 18B (leading support segment) and fifth support segment 18A (trailing support segment) and a guide, such as drumette guide bar 40 and/or tip guide bar 42. In block or step 427, holding poultry wing PW and/or shoulder joint SJ therein trough 25 positioned therein wing wheel 20. Thus, enabling improved and/or efficient release of poultry wing PW therefrom poultry wing shackle 18.1 as poultry wing PW is preferably being frictionally engaged by drumette guide bar 40B, tip guide bar 42B, and/or troughs 25 of wing wheel 20 as poultry wings PW traverses in an arcuate path about wing wheel 20, shown by direction arrows 19, shown in FIG. 5A.

Figure 5:
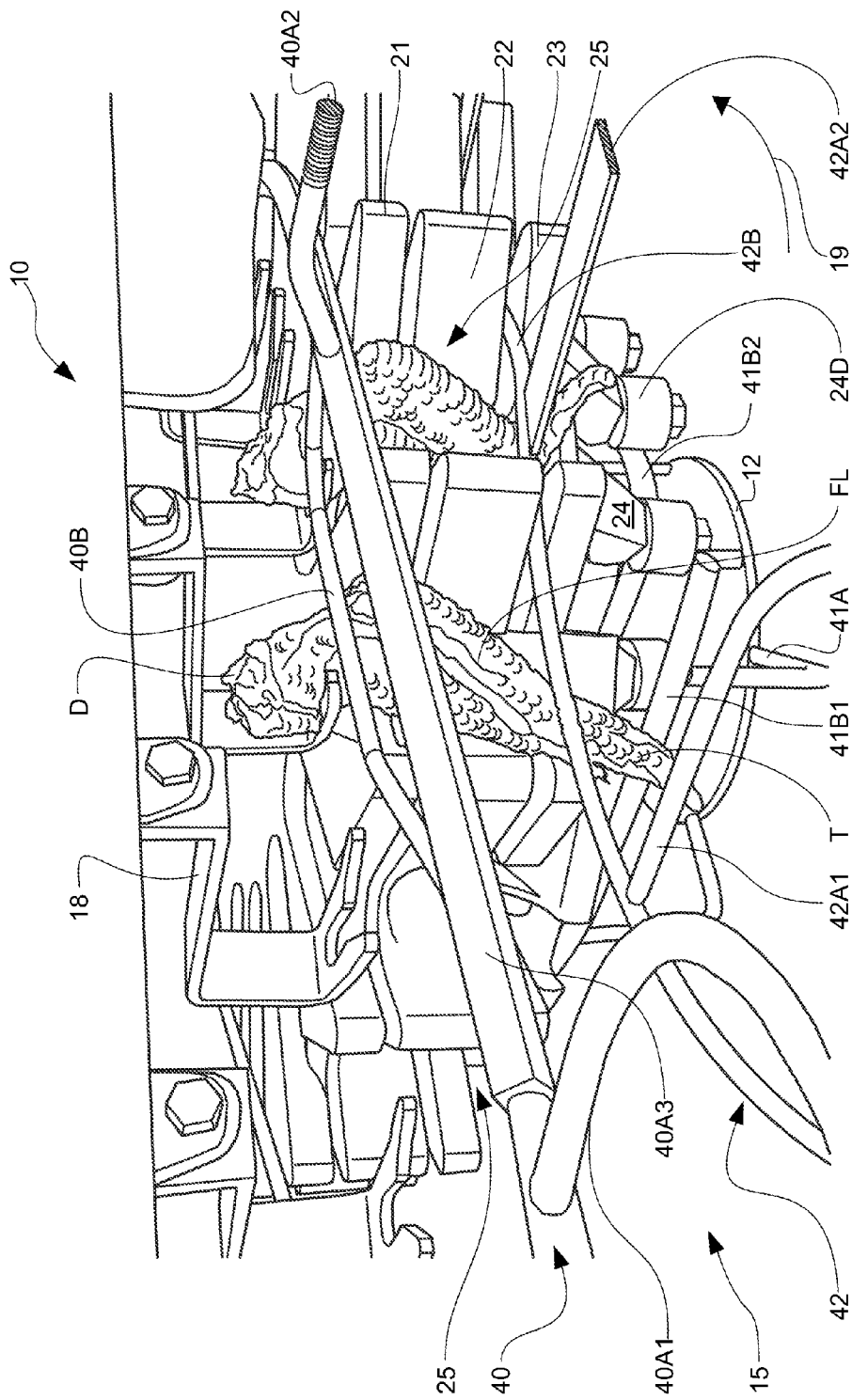
FIG. 5 is a partial perspective side view of the exemplary poultry wing segmenter of FIG. 1, showing one or more exemplary guide bars to assist shackle assemblies with positioning or loading poultry wings therein troughs of wing wheel.

Referring now to FIG. 5 by way of example, and not limitation, there is illustrated a partial perspective side view of poultry wing segmenter 10 showing one or more exemplary guide bars 15 preferably configured to assist shackle assemblies 18 with delivery, positioning, holding, loading and/or unloading of poultry wings PW in troughs 25 of wing wheel 20. Preferably, poultry wing segmenter 10 includes one or more guide bars 15, such as drumette guide bar 40 and tip guide bar 42. Moreover, drumette guide bar 40 includes one or more drumette support bars 40A, such as drumette support bar 40A1, drumette support bar 40A2, and drumette support bar 40A3 configured to provide support and position therefrom frame 12 (shown in FIG. 1) and delivery, positioning, holding, loading and/or unloading of drumette D. Preferably, drumette support bars 40A position and support drumette guide bar 40B from frame 12 (shown in FIG. 1). Furthermore, tip guide bar 42 includes one or more tip support bars 42A, such as tip support bar 42A1 and tip support bar 42A2 configured to provide support and position therefrom frame 12 (shown in FIG. 1) and delivery, positioning, holding, loading and/or unloading of tip joint TJ, flat FL, and tip T. Preferably, tip support bars 42A positions and supports tip leading guide bar 42B from frame 12 (shown in FIG. 1).

It is recognized herein that drumette guide bar 40B and tip leading guide bar 42B are configured as stationary curved rods that extend in the poultry wings PW processing path adjacent the perimeter of wing wheel 20, as indicated by direction arrows 19 until poultry wings PW begin to move in an arcuate path about wing wheel 20. This preferably assures that poultry wings PW will be properly positioned within troughs 25 of wing wheel 20, such as drumette D is positioned in first wheel segment 21 of troughs 25, flat FL is positioned in second wheel segment 22 of troughs 25, and tip T is positioned in third wheel segment 23 of troughs 25 as poultry wings PW are being frictionally engaged by drumette guide bar 40B and tip guide bar 42B. It is recognized herein that this sequence properly orients either left poultry wings PWL and/or right poultry wings PWR within troughs 25 of wing wheel 20 for subsequent processes.

In use, as shackle assemblies 18 preferably traverses around wing wheel 20, as indicated by direction arrows 19, drumette D of poultry wings PW preferably contacts drumette guide bar 40B. Drumette guide bar 40B is preferably configured to urge, push, hold, and/or force drumette D into first wheel segment 21 of troughs 25 of wing wheel 20 of poultry wing segmenter 10 without operator assistance. As poultry wings PW continues its sequence shackle assemblies 18 continues on an inner path relative to of wing wheel 20 outer path, wherein drumette guide bar 40B transfers or releases drumette D of poultry wings PW to first wheel segment 21 of troughs 25 of wing wheel 20 as poultry wings PW traverses wing wheel 20 of poultry wing segmenter 10.

Moreover, as shackle assemblies 18 preferably traverses around wing wheel 20, as indicated by direction arrows 19, tip T of poultry wings PW preferably contacts tip guide bar 42B. Tip guide bar 42B is preferably configured to urge, push, hold, and/or force tip T and/or flat FL into third wheel segment 23 and second wheel segment 22, respectively, of troughs 25 of wing wheel 20 of poultry wing segmenter 10 without operator assistance. As poultry wings PW continues its sequence tip guide bar 42B preferably urges or pushes tip T of poultry wings PW into third wheel segment 23 of troughs 25 of wing wheel 20 as roller 24D of wing tip cup module 24 contacts and pivots about cam 41B, such wing tip cup module 24 is preferably configured to fold tip T of poultry wings PW and hold tip T of poultry wings PW as poultry wings PW traverses wing wheel 20 of poultry wing segmenter 10.

It is recognized herein that the configuration set forth in this FIG. 5, more specifically first wheel segment 21, second wheel segment 22, third wheel segment 23 of troughs 25 of wing wheel 20, drumette guide bar 40B, tip guide bar 42B, wing tip module 24, and roller 24D of wing tip cup module 24 contacts and pivots about cam 41B, such configuration enable different sized poultry wings PW to be accommodated by poultry wing segmenter 10.

Figure 5A:
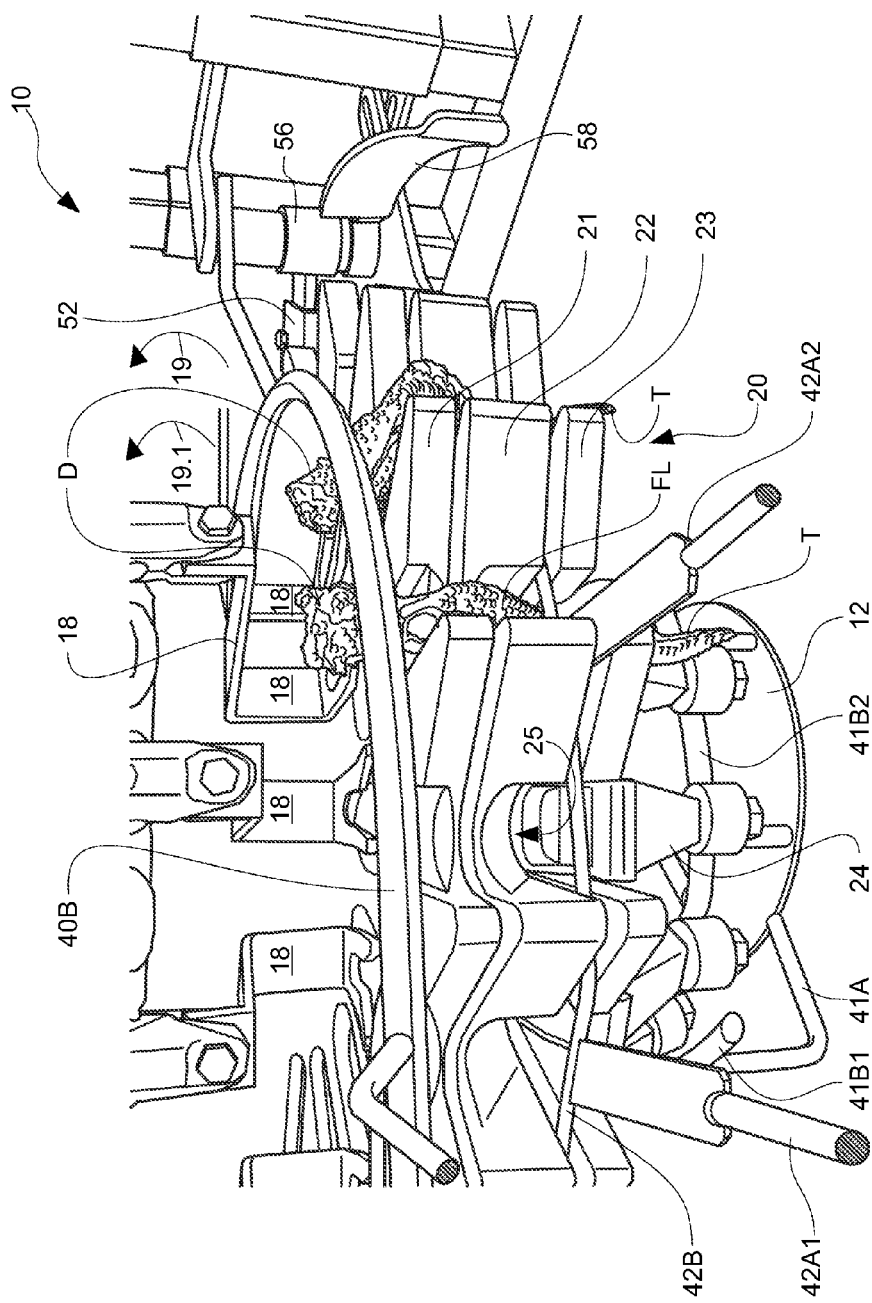
FIG. 5A is a partial perspective side view of the poultry wing segmenter of FIG. 1, showing one or more exemplary guide bars to assist shackle assemblies with release and/or transfer of poultry wings therein troughs of wing wheel.

Referring now to FIG. 5A by way of example, and not limitation, there is illustrated a partial perspective side view of poultry wing segmenter 10 showing one or more exemplary guide bars 15 preferably configured to assist shackle assemblies 18 with release and transfer of poultry wings PW into troughs 25 of wing wheel 20. Preferably, shackle assemblies 18 preferably traverses around an inner circle or path relative to wing wheel 20, as indicated by inner direction arrows 19.1 while wing wheel 20 traverses around an outer circle or path relative to shackle assemblies 18, as indicated by outer direction arrows 19, whereby wing wheel 20 pulls and shackle assemblies 18 releases poultry wings PW into troughs 25 of wing wheel 20, and poultry wings PW is preferably held therein by guide bars 15, such as drumette guide bar 40B (and tip guide bar 42B), which transfers or releases drumette D of poultry wings PW to first wheel segment 21 of troughs 25 of wing wheel 20 in preparation for portioning.

It is recognized herein that poultry wing segmenter 10 is preferably configured to remove or transfer poultry wings PW from shackle assemblies 18 to wing wheel 20 prior to cutting poultry wings PW into is segments.

It is recognized herein that poultry wing segmenter 10 is preferably configured to provide wing wheel 20 to have troughs 25 with adjacent pivoting wing tip cup module 24 activated or operated by cam 41B to facilitate transfer of poultry wings PW from shackle assemblies 18 to wing wheel 20 prior to cutting poultry wings PW into its segments.

Figure 6:
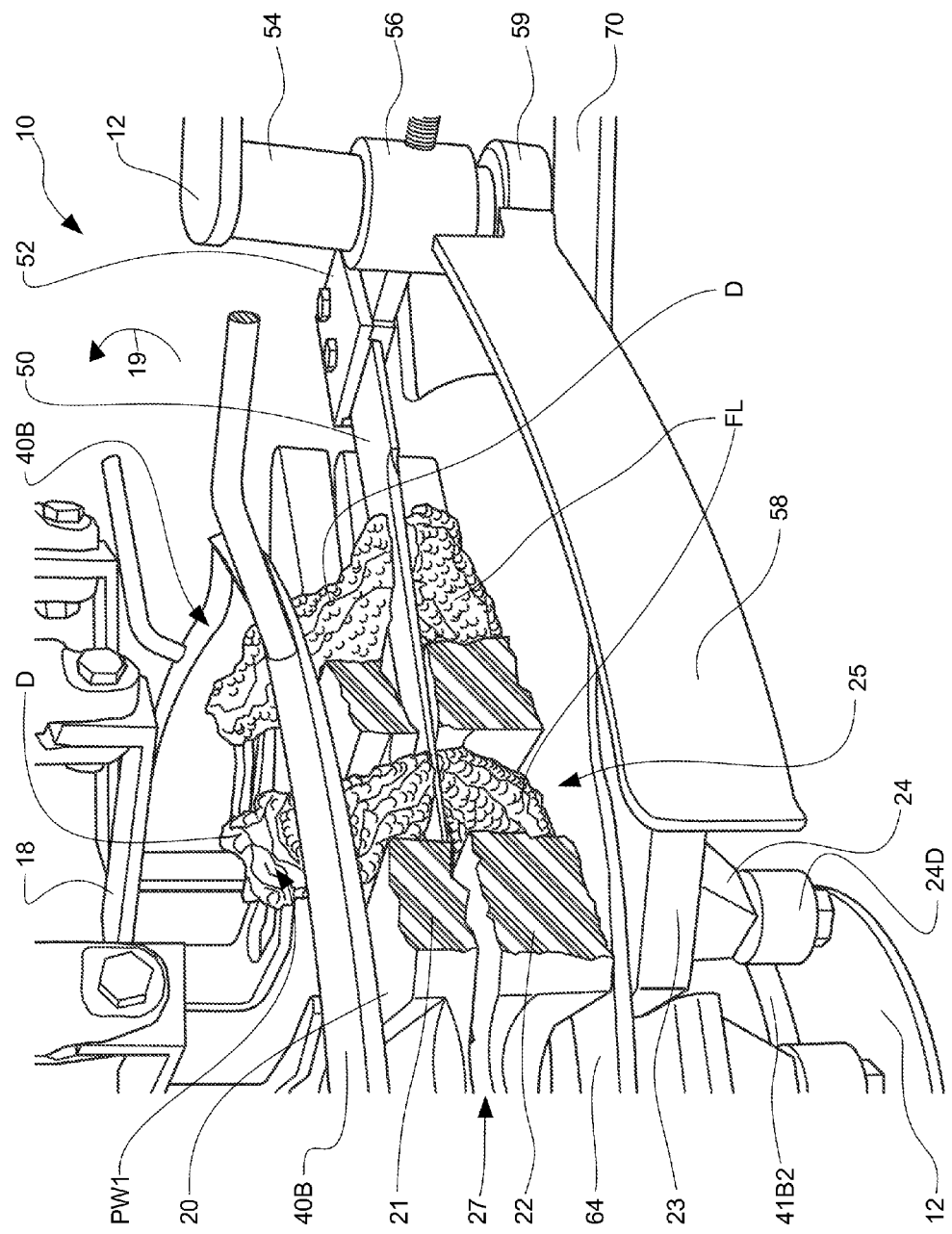
FIG. 6 is a partial cutaway perspective side view of poultry wing segmenter of FIG. 1, showing first blade positioned therein first annular slot.

Referring now to FIG. 6 by way of example, and not limitation, there is illustrated a partial cutaway perspective side view of poultry wing segmenter 10 showing one or more stationary knives or blades, such as first blade 50. Preferably, first blade 50 includes releasable holder 52, an adjustment device, such as collar adjuster 56, shaft 54 affixed to frame 12, and blade attachment device 59 and blade guard 58. As illustrated in FIG. 6, further rotation or movement of poultry wings PW about wing wheel 20, as indicated by direction arrows 19, causes poultry wings PW to come in contact with first blade 50 cutting the poultry wing PW at the mid or elbow joint positioned between the drumette D and flat FL while the poultry wings PW are bent about the mid or elbow joint positioned between the drumette D and flat FL by preferably drumette guide bar 40B.

It is recognized herein that first poultry wings PW, as shown in FIG. 6, further movement of first poultry wings PW about wing wheel 20 causes further outward bending of first poultry wings PW at the mid or elbow joint positioned between the drumette D and flat FL to provide Grade A high speed elbow joint cuts between drumette D and flat FL without producing shattered or fragmented bone segments, exposed open bone areas, and/or bone marrow and contaminations thereof.

It is recognized herein that the configuration set forth in FIG. 6, more specifically first wheel segment 21, second wheel segment 22, are preferably contoured or convex configuration of troughs 25 of wing wheel 20, drumette guide bar 40B, such configuration enables cutting by first blade 50 of poultry wing PW at the mid or elbow joint positioned between drumette D and flat FL while the poultry wings PW are bent about contoured or convex configuration of troughs 25. Contoured or convex configuration of troughs 25 of poultry wing segmenter 10 preferably separates the elbow joint between the drumette D and flat FL to provide Grade A high speed elbow joint cuts between drumette D and flat FL without producing shattered or fragmented bone segments, exposed open bone areas, and/or bone marrow and contaminations thereof.

It is recognized herein that the configuration set forth in this FIG. 6, more specifically wing wheel 20, in which the poultry wings PW are vertically positioned and presented for being cut into drumette D, and flats FL, at this stage of the sequence. Specifically, such horizontally rotatable wing wheel 20 has one or more annular slots or grooves, such as first annular slot 27 into which first blade 50 is preferably positioned. With poultry wing PW received in one of contoured troughs 25 of wing wheel 20 such that the elbow joint of such poultry wing PW aligns respectively with first annular slot 27 of wing wheel 20, poultry wing segmenter 10 is preferably configured to draw first blade 50 through such first annular slot 27 so as to cut apart poultry wing PW at the respective elbow joint between drumette D and flat FL.

Figure 7:
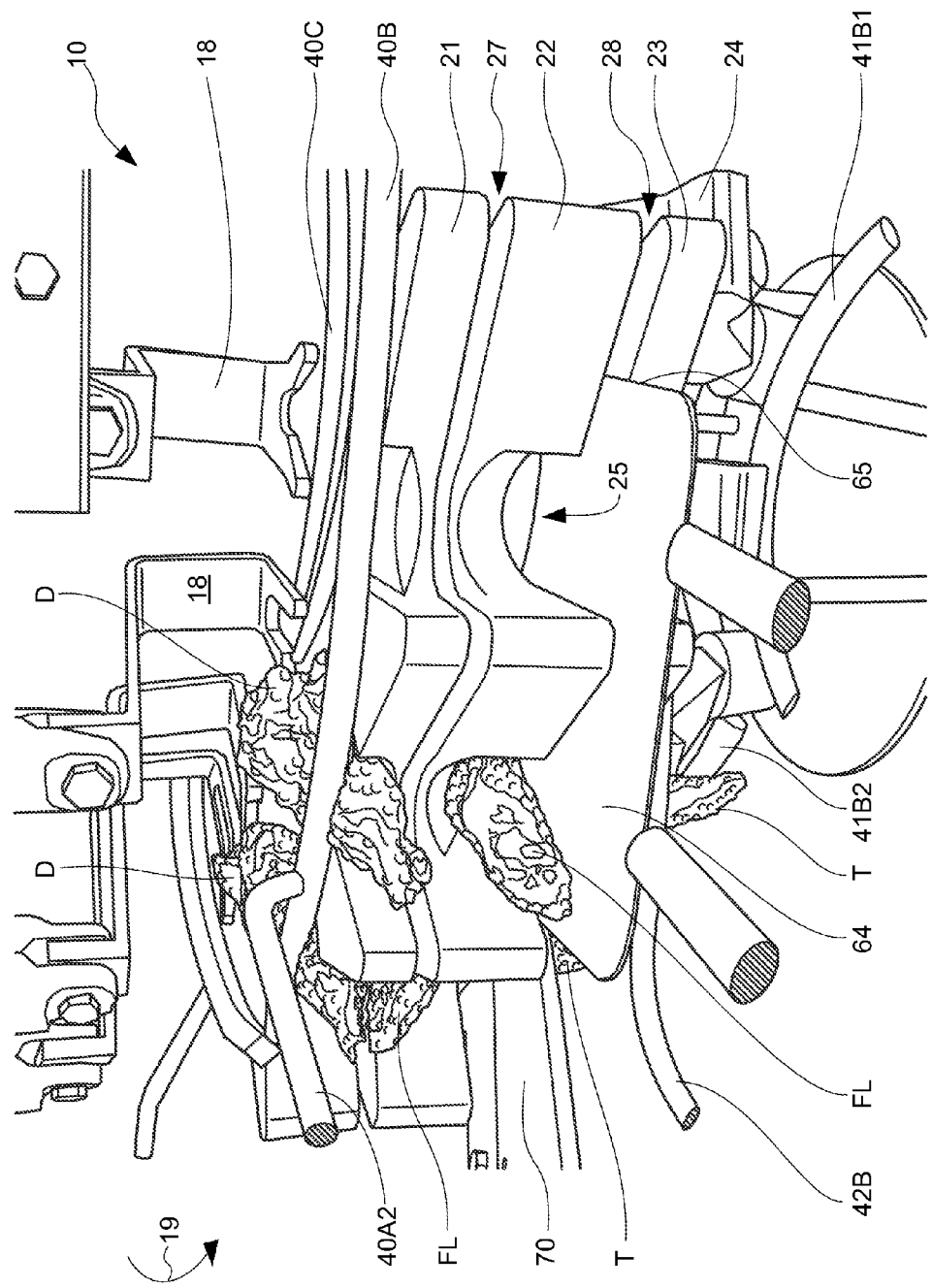
FIG. 7 is a partial cutaway perspective side view of poultry wing segmenter of FIG. 1, showing poultry wings released from shackle assemblies into troughs of the wing wheel.

Referring now to FIG. 7 by way of example, and not limitation, there is illustrated a partial cutaway perspective side view of poultry wing segmenter 10 showing poultry wings PW released from shackle assemblies 18 into troughs 25 of wing wheel 20, and poultry wings PW is preferably held therein by guide bars 15, such as drumette guide bar 40B (and drumette exit guide bar 40C), which transfers or releases drumette D of poultry wings PW to first wheel segment 21 of troughs 25 of wing wheel 20 in preparation for portioning. Preferably, at this sequence, poultry wings PW is preferably separated or portioned at the elbow joint between the drumette D and flat FL by first blade 50 and flat FL is preferably deposited or discharged onto a horizontal surface, such as slide plate 64 positioned therein at least one of annular slots or grooves, such as second annular slot 28. Flat FL is preferably further rotated by wing wheel 20, as indicated by direction arrows 19, and second wheel segment 22 of troughs 25 of wing wheel 20 and slide plate 64 are preferably configured to carry or hold flat FL, as indicated by direction arrows 19, until flat FL reaches slide plate edge 65 where flat FL is preferably discharged into a bin, shoot, or receptacle (shown in FIG. 11) for collecting flat FL.

Figure 8:
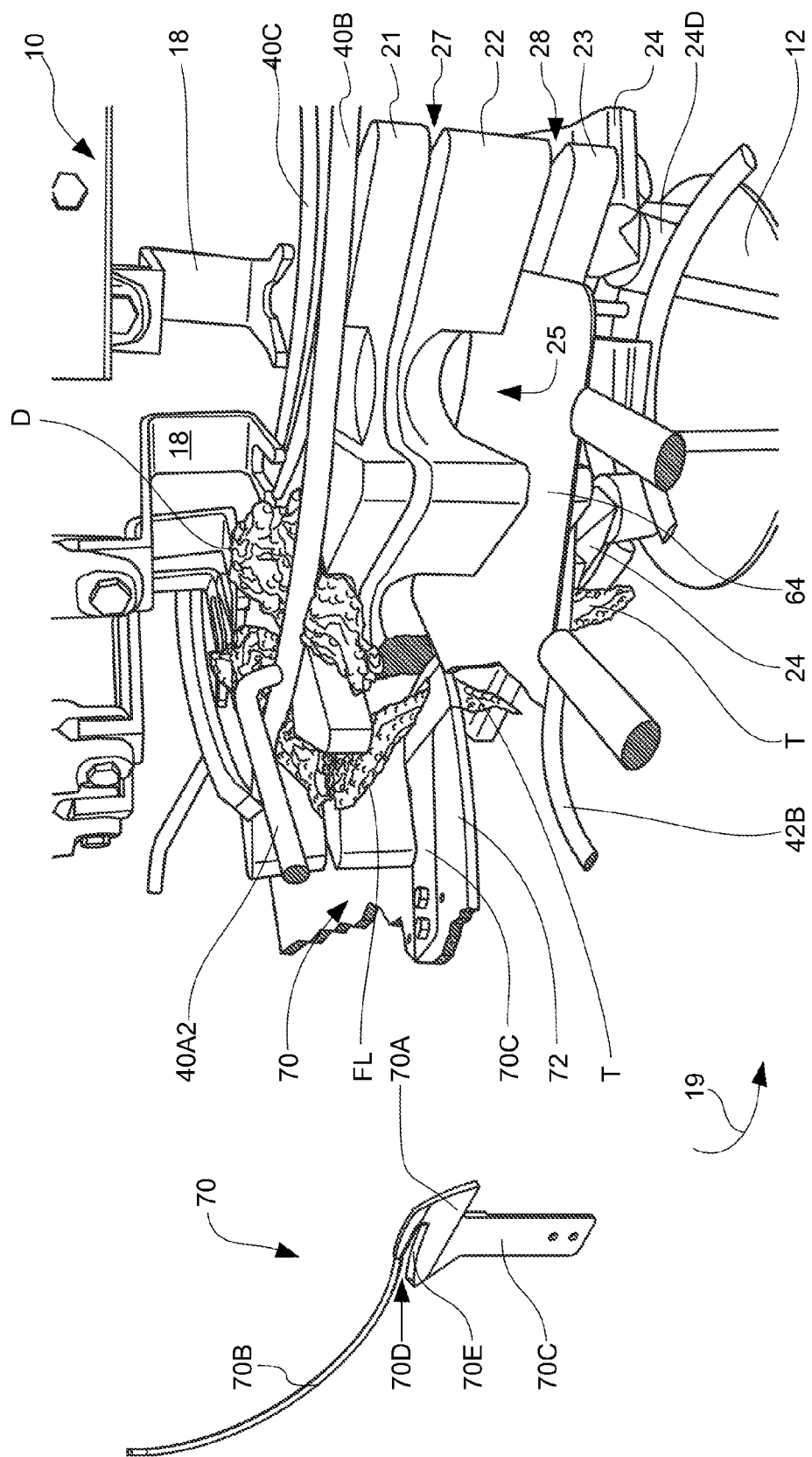
FIG. 8 is a partial cutaway perspective side view of poultry wing segmenter of FIG. 1, showing second blade positioned therein first annular slot.

Referring now to FIG. 8 by way of example, and not limitation, there is illustrated a partial cutaway perspective side view of poultry wing segmenter 10 showing one or more stationary knives or blades, such as second blade 70. Preferably, poultry wing segmenter 10 includes second blade 70 similarly affixed to frame 12 as first blade 50 and includes releasable holder 72 and blade handle 70C. Second blade 70 preferably includes bifurcated blade 70A, beveled edge 70E, guide wire 70B, blade handle 70C, and blade opening 70D.

As illustrated in FIG. 8, further rotation or movement of poultry wings PW about wing wheel 20, as indicated by direction arrows 19, causes poultry wings PW to traverse guide wire 70B, and aligned contact with bifurcated blade 70A of second blade 70 cutting the poultry wing PW at the lower or wrist joint positioned between the flat FL and tip T while the poultry wings PW are bent about the lower or wrist joint positioned between the flat FL and tip T preferably by tip guide bar 42B (as shown in FIGS. 5 and 7).

It is recognized herein that first poultry wings PW, as shown in FIG. 8, further movement of first poultry wings PW about wing wheel 20 causes beveled edge 70E to separate the lower or wrist joint positioned between the flat FL and tip T to provide Grade A high speed lower or wrist joint cuts between the flat FL and tip T without producing shattered or fragmented bone segments, exposed open bone areas, and/or bone marrow and contaminations thereof.

It is recognized herein that first poultry wings PW, as shown in FIG. 8, further movement of first poultry wings PW about wing wheel 20 causes further outward bending of first poultry wings PW at the lower or wrist joint positioned between the flat FL and tip T to provide Grade A high speed lower or wrist joint cuts between the flat FL and tip T without producing shattered or fragmented bone segments, exposed open bone areas, and/or bone marrow and contaminations thereof.

It is recognized herein that the configuration set forth in FIG. 8, more specifically second wheel segment 22, third wheel segment 23, are preferably contoured or convex configuration of troughs 25 of wing wheel 20, tip guide bar 42B, wing tip cup module 24, and/or roller 24D of wing tip module 24, such configuration enables cutting by second blade 70 of poultry wing PW at the lower or wrist joint positioned between the flat FL and tip T while the poultry wings PW are bent about contoured or convex configuration of troughs 25. Contoured or convex configuration of troughs of poultry wing segmenter 10 preferably separates the lower or wrist joint positioned between the flat FL and tip T to provide Grade A high speed elbow joint cuts between flat FL and tip T without producing shattered or fragmented bone segments, exposed open bone areas, and/or bone marrow and contaminations thereof.

It is recognized herein that the configuration set forth in this FIG. 8, more specifically wing wheel 20, in which the poultry wings PW are vertically positioned and presented for being cut into flats FL and tip T, at this stage of the sequence. Specifically, such horizontally rotatable wing wheel 20 has one or more annular slots or grooves, such as second annular slot 28 into which second blade 70 is preferably positioned. With poultry wing PW received in one of contoured troughs 25 of wing wheel 20 such that lower or wrist joint positioned between the flat FL and tip T aligns respectively with second annular slot 28 of wing wheel 20, poultry wing segmenter 10 is preferably configured to draw second blade 70 through such second annular slot 28 so as to cut apart poultry wing PW at the respective lower or wrist joint positioned between the flat FL and tip T.

Moreover, as shackle assemblies 18 preferably traverses around wing wheel 20, as indicated by direction arrows 19, poultry wings PW is preferably separated or portioned at the elbow joint between the drumette D and flat FL by first blade 50 and flat FL is preferably deposited or discharged onto a horizontal surface, such as slide plate 64 positioned therein at least one of annular slots or grooves, such as second annular slot 28 and poultry wings PW is preferably separated or portioned at the lower or wrist joint between the flat FL and tip T by second blade 70 and tip T is preferably held by tip guide bar 42B in third wheel segment 23 of troughs 25 of wing wheel 20 as roller 24D of wing tip cup module 24 contacts and pivots about cam 41B, such wing tip cup module 24 is preferably configured to fold tip T of poultry wings PW and hold tip T of poultry wings PW as poultry wings PW traverses wing wheel 20 of poultry wing segmenter 10.

Referring now to FIGS. 8.1 and 8.2 by way of example, and not limitation, there is illustrated a perspective top view of second blade 70 and releasable holder 72 shown disassembled/assembled, respectively. Preferably, second blade 70 includes two edged, split or v-shaped blades, such as bifurcated blade 70A, having an edge, preferably sharpened edge, such as first beveled edge 70E1 and second beveled edge 70E2 configured having blade opening, such as, bifurcated blade opening 70D, first guide, such as guide wire 70B, blade handle 70C configured with apertures, such as first blade handle aperture 70G1 and second blade handle aperture 70G2. Moreover, releasable holder 72 preferably includes second guide, such as guide edge 72B, guide body 72A to position and support guide edge 72B, blade handle receptacle 72C to receive blade handle 70C. It is recognized herein that guide wire 70B and guide edge 72B may include sharpened and/or dulled sections and further rotation or movement of poultry wings PW about wing wheel 20, as indicated by direction arrows 19, causes poultry wings PW to traverse guide wire 70B and guide edge 72B, and align and align poultry wing PW at the lower or wrist joint positioned between the flat FL and tip T with bifurcated blade opening 70D of second blade 70 cutting the poultry wing PW at the lower or wrist joint positioned between the flat FL and tip T while the poultry wings PW are bent about the lower or wrist joint positioned between the flat FL and tip T preferably by tip guide bar 42B (as shown in FIGS. 5 and 7).

It is further contemplated herein that guide wire 70B and guide edge 72B are preferably curved to match rotation arc of wing wheel 20, as indicated by direction arrows 19, shown in FIGS. 5 and 6.

Moreover, an attachment device, such as one or more threaded bolts 70F1 and 70F2 may be positioned therein one or more apertures 70G1 and 70G2 of blade handle receptacle 72C, wherein one or more threaded bolts 70F1 and 70F2 are preferably threaded therein one or more threaded apertures 72F1 and 72F2 to releasably affix blade handle 70C therein blade handle receptacle 72C and releasable join second blade 70 and releasable holder 72, as shown in FIG. 8.2. Preferably, releasable holder 72 is releasably and adjustably affixed thereto frame 12 by extension arms 72D1 and 72D2 configured with adjustment slots 72E1 and 72E2 and further adjustably positions second blade 70 therein second annular slot 28 of wing wheel 20.

As illustrated in FIGS. 8.1 and 8.2, further rotation or movement of poultry wings PW about wing wheel 20, as indicated by direction arrows 19, causes poultry wings PW to traverse between guide wire 70B and guide edge 72B, and align contact with bifurcated blade 70A of second blade 70 cutting the poultry wing PW at the lower or wrist joint positioned between the flat FL and tip T while the poultry wings PW are bent about the lower or wrist joint positioned between the flat FL and tip T preferably by tip guide bar 42B (as shown in FIGS. 5 and 7) without producing shattered or fragmented bone segments, exposed open bone areas, and/or bone marrow or other contaminations thereof.

Referring now to FIG. 8.3 by way of example, and not limitation, there is illustrated a flow diagram 830 of a method of segmenting a poultry wing PW having a poultry wing PW joint. In block or step 831, providing a bifurcated blade, such as second blade 70 having edge or sharpened edge, such as first beveled edge 70E1 and second beveled edge 70E2, and second blade 70 having a guide, such as first guide, including guide wire 70B and second guide, such as guide edge 72B. In block or step 832, guiding the poultry wing PW along a guide, such as first guide, including guide wire 70B and second guide, including guide edge 72B. In block or step 833, aligning the poultry wing PW joint with the guide, such as first guide including guide wire 70B and second guide, such as guide edge 72B. In block or step 833, aligning the poultry wing PW joint therebetween said first guide, including guide wire 70B and said second guide, including guide edge 72B. In block or step 834, directing the poultry wing PW joint toward bifurcated blade, such as second blade 70 including bifurcated blade opening 70D. In block or step 835, separating the poultry wing PW joint with the guide, such as first guide, including guide wire 70B and second guide, such as guide edge 72B, pinched therebetween. In block or step 836, cutting the poultry wing PW at the poultry wing PW joint with the bifurcated blade, such as second blade 70 without producing shattered or fragmented bone segments, exposed open bone areas, and/or bone marrow or other contaminations thereof.

Figure 9:
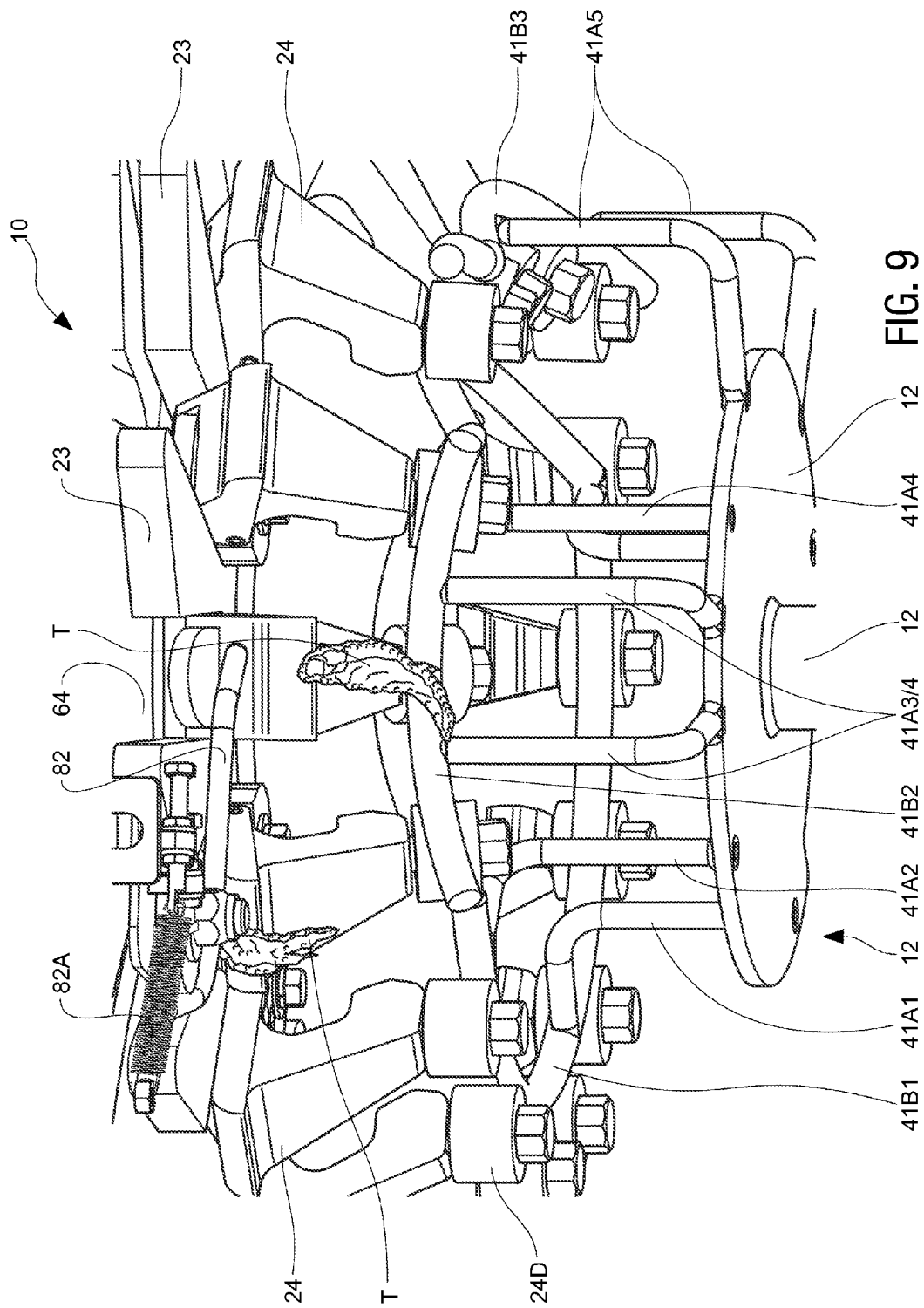
FIG. 9 is a partial cutaway perspective side view of poultry wing segmenter of FIG. 1, showing operation of tip cup module 24 about cam 41B.

Referring now to FIG. 9 by way of example, and not limitation, there is illustrated a partial cutaway perspective side view of poultry wing segmenter 10 showing operation of tip cup module 24 about cam 41B. Preferably cam 41B includes one or more cams, such as cam 41B1, cam 41B2, and cam 41B3 and such cams are positioned and supported by cam supports 41A, (including 41A1, 41A2, 41A3, 41A4, and 41A5) positioned between frame 12 and cams 41B. Preferably, as poultry wings PW continues its sequence roller 24D of wing tip cup module 24 contacts and pivots about cams 41B1, such that wing tip cup module 24 is preferably configured to pivot and fold tip T of poultry wings PW and hold tip T of poultry wings PW. Preferably, as poultry wings PW continues its sequence roller 24D of wing tip cup module 24 contacts and pivots about cams 41B2, such that wing tip cup module 24 bends or pivots to releases tip T of poultry wings PW to preferably discharged tip T into a bin, shoot, or receptacle (shown in FIG. 11) for collecting tip T as poultry wings PW traverses wing wheel 20 of poultry wing segmenter 10.

It is recognized herein that the configuration set forth in FIG. 9, preferably enables wing tip cup module 24 to pivot in and out of poultry wing segmenter 10, and more specifically pivot in and out relative to wing wheel 20 to enable tip T of the poultry wings PW to be loaded and closed to hold tip T of the poultry wings PW in wing wheel 20 for cutting, and opens again after cutting to enable tip T of the poultry wings PW to be discharged into a bin, shoot, or receptacle (shown in FIG. 11) for collecting tip T as poultry wings PW traverses wing wheel 20 of poultry wing segmenter 10. It is further recognized herein that tip T will not release or discharge from of troughs 25 of wing wheel 20 unless wing tip cup module 24 pivots about pin 24B by movement of roller 24D across cam 41B.

Moreover, if the tip T of the poultry wings PW happens to stick to wing tip cup module 24 and tip T is unable to discharge poultry wing segmenter 10, poultry wing segmenter 10 preferably includes rotational unloader bar 82 rotationally affixed to frame 12 and a bias mechanism, such as spring 82A. Preferably unloader bar 82 is disposed or positioned adjacent open tip cup module 24 to contact tip T stuck in wing tip cup module 24 and discharged tip T into a bin, shoot, or receptacle (shown in FIG. 11) for collecting tip T as poultry wings PW traverses wing wheel 20 of poultry wing segmenter 10.

Figure 10:
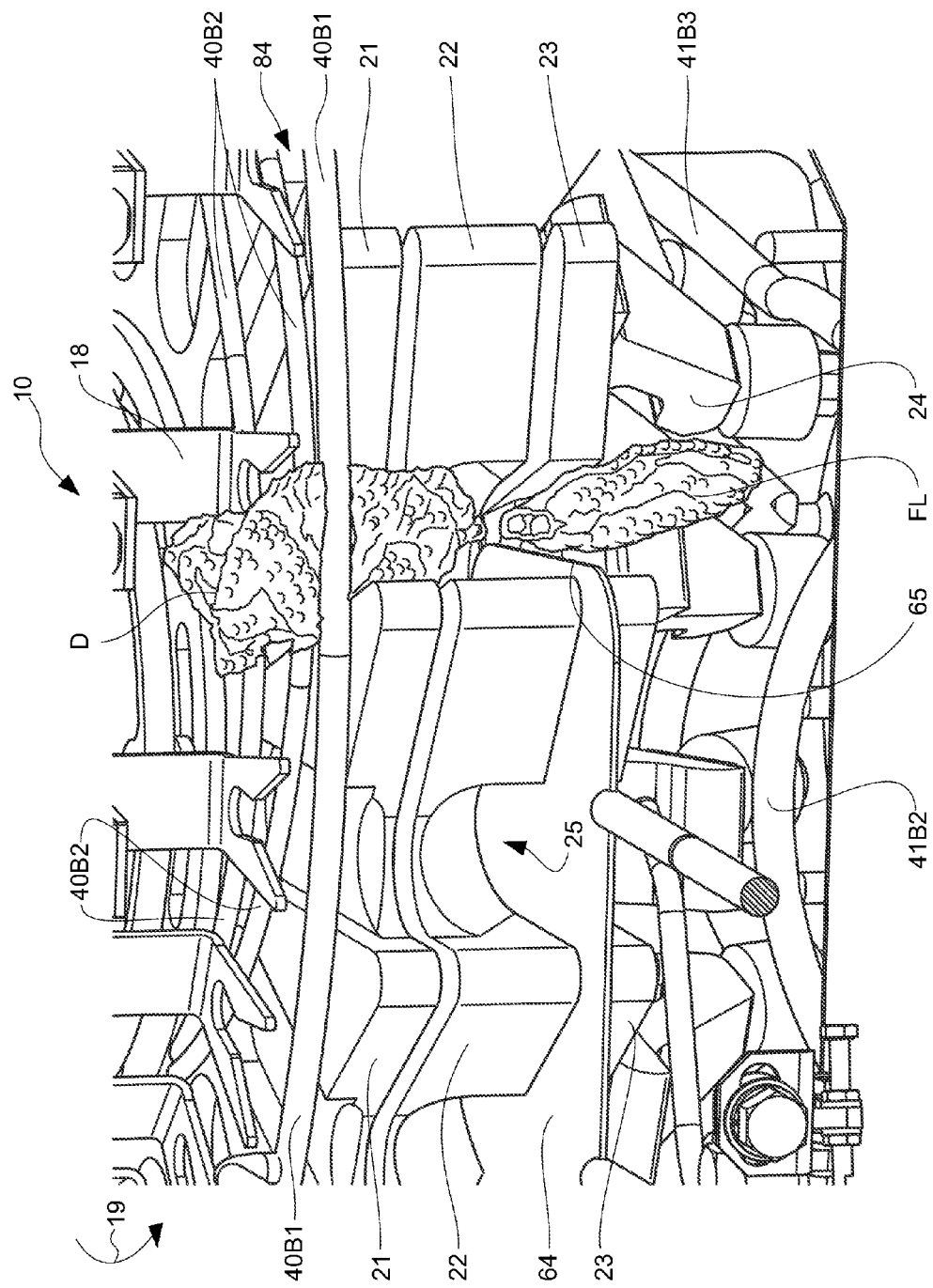
FIG. 10 is a partial cutaway perspective side view of poultry wing segmenter of FIG. 1, showing flat slide plate configured to carry poultry wing flat.

Referring now to FIG. 10 by way of example, and not limitation, there is illustrated a partial cutaway perspective side view of poultry wing segmenter 10 showing slide plate 64 configured to carry flat FL, as indicated by direction arrows 19. Preferably second wheel segment 22 of troughs 25 of wing wheel 20 and slide plate 64 are preferably configured to carry flat FL, as indicated by direction arrows 19, until flat FL reaches slide plate edge 65 where flat FL is preferably discharged or falls into a bin, shoot, or receptacle (shown in FIG. 11) for collecting flat FL.

Moreover, as poultry wings PW traverses around wing wheel 20, as indicated by direction arrows 19, drumette D of poultry wings PW preferably contacts outside drumette guide bar 40B1 and inside drumette guide bar 40B2, both preferably configured to urge and/or pull drumette D from troughs 25 of first wheel segment 21 of wing wheel 20 of poultry wing segmenter 10 preferably discharged drumette D into a bin, shoot, or receptacle (shown in FIG. 11) for collecting flat FL. It is recognized that outside drumette guide bar 40B1 and inside drumette guide bar 40B2 separate from one another to enable wing wheel 20 to discharged drumette D.

Figure 11:
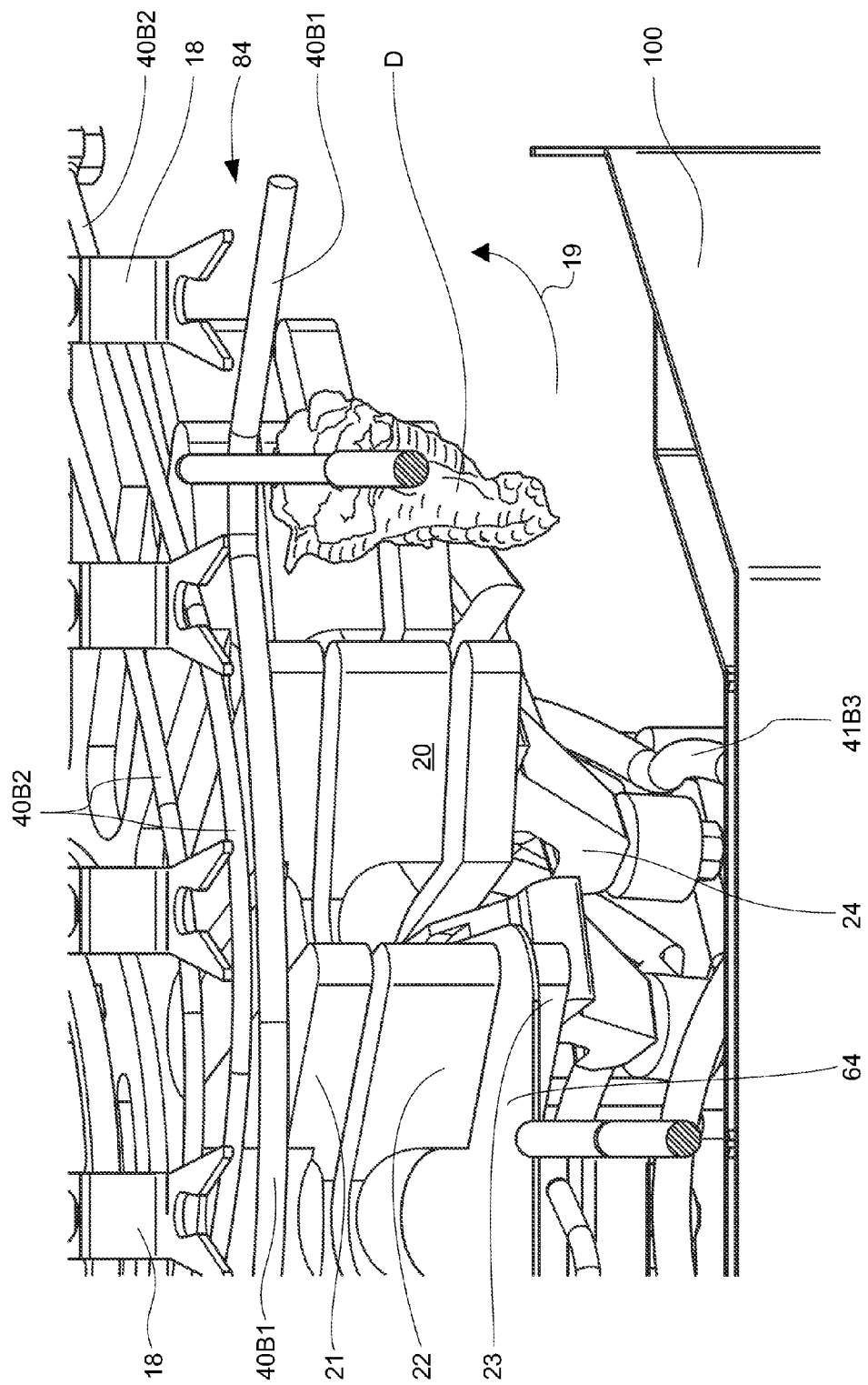
FIG. 11 is a partial cutaway perspective side view of poultry wing segmenter of FIG. 1, showing discharge of drumette from the poultry wing segmenter.

Referring now to FIG. 11 by way of example, and not limitation, there is illustrated a partial cutaway perspective side view of poultry wing segmenter 10 showing discharged of drumette D into a bin, shoot, hopper, or receptacle 100. Preferably, as poultry wings PW traverse around wing wheel 20, as indicated by direction arrows 19, drumette D of poultry wings PW is preferably released from poultry wing segmenter 10 as outside drumette guide bar 40B1 and inside drumette guide bar 40B2 separate from one another as shown by gap 84 to enable wing wheel 20 to discharged drumette D into receptacle 100.

Figure 12:
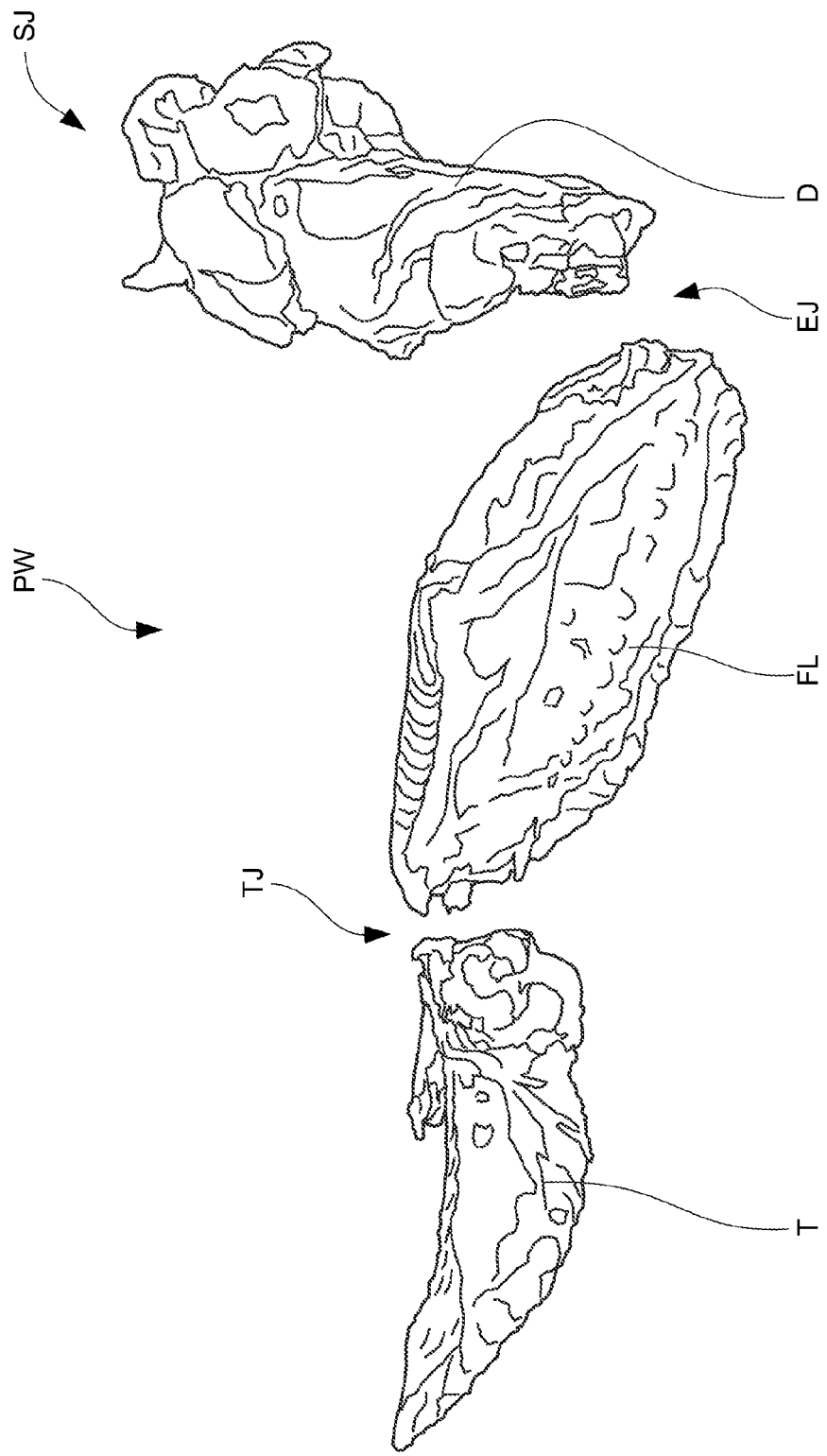
FIG. 12 is a side view of an exemplary poultry wing, shown with segments drumette D, flat FL, and tip T.

Referring now to FIG. 12 by way of example, and not limitation, there is illustrated poultry wings PW. Preferably, poultry wing segmenter 10 segments or portions poultry wings PW by cutting poultry wings PW at the elbow joint EJ between the drumette D and flat FL, and at the tip joint TJ between the flat FL and tip T sections to produce separate poultry wing segments drumette D, flat FL, and tip T.

The foregoing description and drawings comprise illustrative embodiments of the present invention. Having thus described exemplary embodiments, it should be noted by those ordinarily skilled in the art that the disclosures within are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one ordinarily skilled in the art to which this invention pertains, having the benefit of the teachings presented in the foregoing descriptions and the associated drawings. Although specific terms may be employed herein, they are used in a generic and descriptive sense only and not for purposes of limitation. Moreover, the present invention has been described in detail; it should be understood that various changes, substitutions and alterations can be made thereto without departing from the spirit and scope of the invention as defined by the appended claims. Accordingly, the present invention is not limited to the specific embodiments illustrated herein, but is limited only by the following claims.

Therefore, at least the following is claimed:

1. A poultry wing segmenting shackle for a drumette shoulder portion of a poultry wing, said shackle comprising
   a bifurcated support device having a first leading support segment and a second trailing support segment, wherein said first leading support segment extends beyond said second trailing support segment.

2. The shackle of claim 1, wherein said bifurcated support device includes a support segment.

3. The shackle of claim 2, wherein said support segment further comprises an alignment device.

4. The shackle of claim 3, wherein said alignment device further comprises an alignment peg.

5. The shackle of claim 2, wherein said support segment further comprises a lateral section.

6. The shackle of claim 2, wherein said support segment further comprises a riser section.

7. The shackle of claim 2, said first leading support segment and said second trailing support segment are configured to form an opening to receive the poultry wing.

8. The shackle of claim 7, wherein said opening is v-shaped.

9. The shackle of claim 7, wherein said opening further comprises an open ended gripper to secure the drumette shoulder of the poultry wing.

10. The shackle of claim 9, wherein said open ended gripper is curved.

11. The shackle of claim 9, wherein said open ended gripper has an opening that is less than a diameter of the drumette shoulder of the poultry wing.

12. A method of controlling a poultry wing having a poultry wing shoulder joint, said method comprising the steps of:
   providing a bifurcated support device having a first leading support segment and a second trailing support segment, wherein said first leading support segment extends beyond said second trailing support segment, a guide, and a trough therein a wing wheel;
   loading the poultry wing into said bifurcated support device with the poultry wing shoulder joint positioned above said bifurcated support device;
   guiding the poultry wing hung in said bifurcated support device along said guide; and unloading the poultry wing into said trough therein said wing wheel.

13. The method of claim 12, further comprising the step of aligning the poultry wing joint therebetween said bifurcated support device and said guide.

14. The method of claim 12, further comprising the step of holding the poultry wing therein said trough of said wing wheel.

* * * * *